United States Patent
Snow et al.

(10) Patent No.: US 10,685,399 B2
(45) Date of Patent: Jun. 16, 2020

(54) DUE DILIGENCE IN ELECTRONIC DOCUMENTS

(71) Applicant: Factom, Austin, TX (US)

(72) Inventors: Paul Snow, Austin, TX (US); Brian Deery, Austin, TX (US); Jason Nadeau, Missouri City, TX (US); Mahesh Paolini-Subramanya, Austin, TX (US)

(73) Assignee: Factom, Inc., Austin, TX (US)

( * ) Notice: Subject to any disclaimer, the term of this patent is extended or adjusted under 35 U.S.C. 154(b) by 342 days.

(21) Appl. No.: 15/475,199

(22) Filed: Mar. 31, 2017

(65) Prior Publication Data

US 2018/0285970 A1   Oct. 4, 2018

(51) Int. Cl.
*G06Q 40/02* (2012.01)
*H04L 9/32* (2006.01)

(52) U.S. Cl.
CPC ......... *G06Q 40/025* (2013.01); *H04L 9/3239* (2013.01); *H04L 9/3247* (2013.01); *G06Q 2220/10* (2013.01); *H04L 2209/38* (2013.01)

(58) Field of Classification Search
CPC ............................................. G06Q 40/00–128
See application file for complete search history.

(56) References Cited

U.S. PATENT DOCUMENTS

| 4,309,569 A | 6/1982 | Merkle |
|---|---|---|
| 5,499,294 A | 3/1996 | Friedman |
| 5,862,218 A | 1/1999 | Steinberg |
| 5,966,446 A | 10/1999 | Davis |
| 7,272,179 B2 | 9/2007 | Siemens et al. |

(Continued)

FOREIGN PATENT DOCUMENTS

| DE | 10128728 | 1/2003 |
|---|---|---|
| JP | 5383297 | 1/2014 |

(Continued)

OTHER PUBLICATIONS

Watanabe, Hiroki, et al. "Blockchain contract: Securing a blockchain applied to smart contracts." 2016 *IEEE International Conference on Consumer Electronics (ICCE)*. IEEE, 2016.

(Continued)

*Primary Examiner* — Calvin L Hewitt, II
*Assistant Examiner* — Taylor S Rak
(74) *Attorney, Agent, or Firm* — Scott P. Zimmerman, PLLC

(57) ABSTRACT

Due diligence of mortgage documents is faster and simpler. An electronic mortgage application often contains or references a collection of many separate electronic mortgage documents. Electronic data representing an original version of an electronic mortgage document and its current version may be hashed to generate digital signatures. Any auditor may then quickly conduct the due diligence by comparing the digital signatures. If the digital signatures match, then the due diligence reveals that the electronic mortgage document has not changed since its creation. However, if the digital signatures do not match, then the electronic mortgage document has changed since its creation. The auditor may thus flag the electronic mortgage document for additional due diligence. Regardless, a result of the due diligence may be incorporated into one or more blockchains.

7 Claims, 31 Drawing Sheets

(56) References Cited

U.S. PATENT DOCUMENTS

| | | | |
|---|---|---|---|
| 7,572,179 B2 | 8/2009 | Choi et al. |
| 7,729,950 B2 | 6/2010 | Mendizabal et al. |
| 8,245,038 B2 | 8/2012 | Golle et al. |
| 8,266,439 B2 | 9/2012 | Haber et al. |
| 8,442,903 B2 | 5/2013 | Zadoorian et al. |
| 8,560,722 B2 | 10/2013 | Gates et al. |
| 8,706,616 B1 | 4/2014 | Flynn |
| 8,712,887 B2 | 4/2014 | DeGroeve et al. |
| 8,867,741 B2 | 10/2014 | McCorkindale et al. |
| 8,943,332 B2 | 1/2015 | Horne et al. |
| 9,124,423 B2 | 9/2015 | Jennas, II et al. |
| 9,396,006 B2 | 7/2016 | Kundu et al. |
| 9,407,431 B2 | 8/2016 | Bellare et al. |
| 9,411,524 B2 | 8/2016 | O'Hare et al. |
| 9,411,976 B2 | 8/2016 | Irvine |
| 9,411,982 B1 | 8/2016 | Dippenaar et al. |
| 9,424,576 B2 | 8/2016 | Vandervort |
| 9,436,935 B2 | 9/2016 | Hudon |
| 9,472,069 B2 | 10/2016 | Roskowski |
| 9,489,827 B2 | 11/2016 | Quinn et al. |
| 9,584,493 B1 | 2/2017 | Leavy |
| 9,722,790 B2 | 8/2017 | Ebrahimi |
| 9,876,646 B2 | 1/2018 | Ebrahimi |
| 9,882,918 B1 | 1/2018 | Ford et al. |
| 2003/0018563 A1 | 1/2003 | Kilgour et al. |
| 2004/0085445 A1 | 5/2004 | Park |
| 2005/0206741 A1 | 9/2005 | Raber |
| 2006/0075228 A1 | 4/2006 | Black et al. |
| 2006/0184443 A1 | 8/2006 | Erez et al. |
| 2007/0094272 A1 | 4/2007 | Yeh |
| 2007/0296817 A1 | 12/2007 | Ebrahimi et al. |
| 2008/0010466 A1 | 1/2008 | Hopper |
| 2009/0025063 A1 | 1/2009 | Thomas |
| 2009/0287597 A1 | 11/2009 | Bahar |
| 2010/0049966 A1 | 2/2010 | Kato |
| 2010/0058476 A1 | 3/2010 | Isoda |
| 2010/0161459 A1 | 6/2010 | Kass et al. |
| 2010/0228798 A1* | 9/2010 | Kodama | H04L 41/0893 707/822 |
| 2010/0241537 A1 | 9/2010 | Kass et al. |
| 2013/0142323 A1 | 6/2013 | Chiarella |
| 2013/0222587 A1 | 8/2013 | Roskowski |
| 2013/0276058 A1 | 10/2013 | Buldas |
| 2014/0229738 A1 | 8/2014 | Sato |
| 2014/0344015 A1 | 11/2014 | Puertolas-Montanes et al. |
| 2015/0193633 A1 | 7/2015 | Chida |
| 2015/0378627 A1 | 12/2015 | Kitazawa |
| 2016/0071096 A1 | 3/2016 | Rosca |
| 2016/0119134 A1 | 4/2016 | Hakoda et al. |
| 2016/0148198 A1 | 5/2016 | Kelley |
| 2016/0162897 A1* | 6/2016 | Feeney | G06Q 20/065 705/71 |
| 2016/0217436 A1 | 7/2016 | Brama |
| 2016/0253663 A1 | 9/2016 | Clark et al. |
| 2016/0260091 A1 | 9/2016 | Tobias |
| 2016/0267472 A1 | 9/2016 | Lingham et al. |
| 2016/0267558 A1 | 9/2016 | Bonnell et al. |
| 2016/0275294 A1 | 9/2016 | Irvine |
| 2016/0283920 A1 | 9/2016 | Fisher et al. |
| 2016/0292396 A1 | 10/2016 | Akerwall |
| 2016/0292672 A1 | 10/2016 | Fay et al. |
| 2016/0292680 A1 | 10/2016 | Wilson, Jr. et al. |
| 2016/0300200 A1 | 10/2016 | Brown et al. |
| 2016/0300234 A1 | 10/2016 | Moss-Pultz et al. |
| 2016/0321675 A1 | 11/2016 | McCoy et al. |
| 2016/0321751 A1 | 11/2016 | Creighton, IV et al. |
| 2016/0328791 A1 | 11/2016 | Parsells et al. |
| 2016/0330031 A1 | 11/2016 | Drego et al. |
| 2016/0330244 A1 | 11/2016 | Denton et al. |
| 2016/0337119 A1 | 11/2016 | Hosaka et al. |
| 2016/0342977 A1 | 11/2016 | Lam |
| 2016/0342989 A1 | 11/2016 | Davis |
| 2016/0344737 A1 | 11/2016 | Anton et al. |
| 2017/0005797 A1 | 1/2017 | Lanc et al. |
| 2017/0033933 A1 | 2/2017 | Haber |
| 2017/0053249 A1 | 2/2017 | Tunnell et al. |
| 2017/0061396 A1 | 3/2017 | Melika et al. |
| 2017/0124534 A1 | 5/2017 | Savolainen |
| 2017/0124535 A1 | 5/2017 | Juels et al. |
| 2017/0177898 A1 | 6/2017 | Dillenberger |
| 2017/0213287 A1 | 7/2017 | Bruno |
| 2017/0243208 A1 | 8/2017 | Kurian et al. |
| 2017/0243289 A1 | 8/2017 | Rufo |
| 2017/0244757 A1 | 8/2017 | Castinado et al. |
| 2017/0330279 A1 | 11/2017 | Ponzone |
| 2017/0352031 A1 | 12/2017 | Collin |
| 2017/0373859 A1 | 12/2017 | Shors et al. |
| 2018/0075527 A1 | 3/2018 | Nagla et al. |
| 2018/0091524 A1 | 3/2018 | Setty et al. |
| 2018/0097779 A1 | 4/2018 | Karame et al. |
| 2018/0101701 A1 | 4/2018 | Barinov |
| 2018/0139042 A1* | 5/2018 | Binning | G06F 21/6218 |
| 2018/0157700 A1 | 6/2018 | Roberts |

FOREIGN PATENT DOCUMENTS

| | | |
|---|---|---|
| KR | 100653512 | 11/2006 |
| KR | 101747221 | 6/2017 |
| WO | WO 0049797 | 8/2000 |
| WO | WO 2007069176 | 6/2007 |
| WO | WO 2015077378 | 5/2015 |
| WO | WO 2018013898 A1 | 1/2018 |
| WO | WO 2018109010 | 6/2018 |

OTHER PUBLICATIONS

"BlockChain Technology", Berkeley Engineering.

Alsolami, Fahad, and Terrance E. Boult. "CloudStash: using secret-sharing scheme to secure data, not keys, in multi-clouds." *Information Technology: New Generations (ITNG), 2014 11th International Conference on.* IEEE, 2014.

Menezes, Alfred. J., et al. "Handbook of Applied Cryptography," 1997, CRC Press, p. 527-28.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Crosby, Michael et al., "BlockChain Technology, Beyond Bitcoin", Sutardj a Center for Entrepreneurship & Technology, Berkeley Engineering, Oct. 16, 2015, 35 pages.

Unknown, "Midex", 1http://promo.midex.com/Midex_EN.pdf, 25 pages.

Unknown, Xtrade White Paper, https://xtrade1-9649.kxcdn.com/wp-content/uploads/2017/09/xtrade-whitepaper.pdf Feb. 7, 2018, 37 pages.

Chakravorty, Antorweep, and Chunming Rong, "Ushare: user controlled social media based on blockchain." *Proceedings of the 11th International Conference on Ubiquitous Information Management and Communication.* ACM, 2017.

Chen, Zhixong, and Yixuan Zhu. "Personal Archive Service System using Blockchain Technology: Case Study, Promising and Challenging." *AI & Mobile Services (AIMS), 2017 IEEE International Conference on.* IEEE, 2017.

Al-Naji, Nader et al., "Basis: A Price-Stable Cryptocurrency with an Algorithmic Central Bank" www.basis.io Jun. 20, 2017, 27 pages.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

* cited by examiner

US 10,685,399 B2

DUE DILIGENCE IN ELECTRONIC DOCUMENTS

CROSS-REFERENCE TO RELATED APPLICATIONS

This application relates to U.S. application Ser. No. 15/419,033 filed Jan. 30, 2017, to U.S. application Ser. No. 15/419,042 filed Jan. 30, 2017, to U.S. application Ser. No. 15/435,612 filed Feb. 17, 2017, to U.S. application Ser. No. 15/452,760 filed Mar. 8, 2017, to U.S. application Ser. No. 15/456,067 filed Mar. 10, 2017, to U.S. application Ser. No. 15/459,061 filed Mar. 15, 2017, and to U.S. application Ser. No. 15/465,702 filed Mar. 22, 2017, with all applications incorporated herein by reference in their entireties.

BACKGROUND

The mortgage industry has learned from the past. The so-called mortgage crisis of 2007 exposed flaws in the mortgage industry. Many mortgages lacked sufficient documentation, checks and balances were not implemented, and fraud was alleged.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 21-22 illustrate secret sharing of the due diligence file, according to exemplary embodiments;

FIGS. 23-24 illustrate a sharing strategy, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
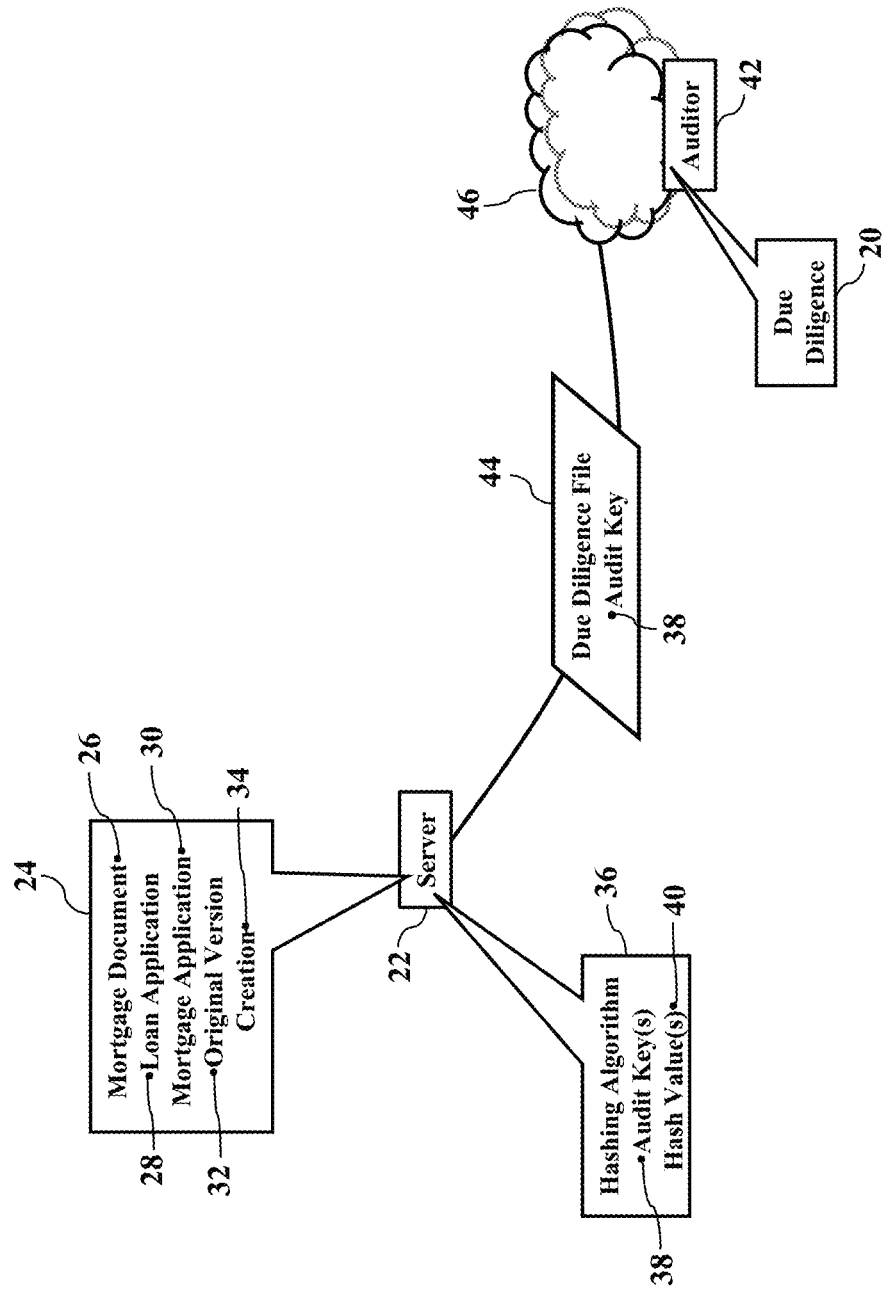
FIGS. 1-8 are simplified illustrations of conducting a due diligence, according to exemplary embodiments.

FIGS. 1-8 are simplified illustrations of conducting a due diligence 20, according to exemplary embodiments. While the due diligence 20 may be performed for any legal, financial, or technical purpose, this disclosure will mainly describe the due diligence 20 for the mortgage industry. That is, FIG. 1 illustrates a server 22 storing electronic data 24 representing one or more electronic mortgage documents 26.

The electronic mortgage documents 26 may be a part or a component of one or more loan applications 30. Indeed, many readers are likely familiar with an electronic mortgage application 30 that is processed when financing a mortgage for a home or business property. The electronic data 24, however, may be associated with any other type of loan, such as a vehicle installment, business or equipment purchase, and even equity lines of credit. The electronic data 24 may also be associated with mortgage backed securities, collateralized mortgage obligations, collateralized debt, real estate investment trust, and other asset-backed investments. Whatever the electronic data 24, the server 22 may retrieve the electronic data 24 representing an original version 32 of the electronic mortgage documents 26 at their date and time of creation 34. The server 22 may then hash the original version 32 of the electronic mortgage documents 26 using a cryptographic hashing algorithm 36. This disclosure defines a cryptographic "audit key" 38 as the hash value(s) 40 generated from hashing the original version 32 of the electronic mortgage documents 26. Exemplary embodiments may generate a single audit key 38 or multiple audit keys 38, as later paragraphs will explain.

An auditor 42 thus performs the due diligence 20. As the reader understands, financial records are often sampled and evaluated, especially for investment purposes. For example, when the electronic mortgage documents 26 are packaged as asset-backed securities, the due diligence 20 is performed with respect to the disclosure of material information during the purchase and sale of securities and other financial transactions. When the auditor 42 conducts the due diligence 20 related to the electronic mortgage documents 26, the server 22 generates one or more virtual due diligence files 44. That is, the server 22 may retrieve the cryptographic audit key(s) 38 generated from hashing the original version 32 of the electronic mortgage documents 26. The server 22 packages or associates the cryptographic audit key(s) 38 to the due diligence file 44 and sends the due diligence file 44 via a communications network 46 to the auditor 42 for examination, verification, compliance, and/or regulatory review.

Figure 2:
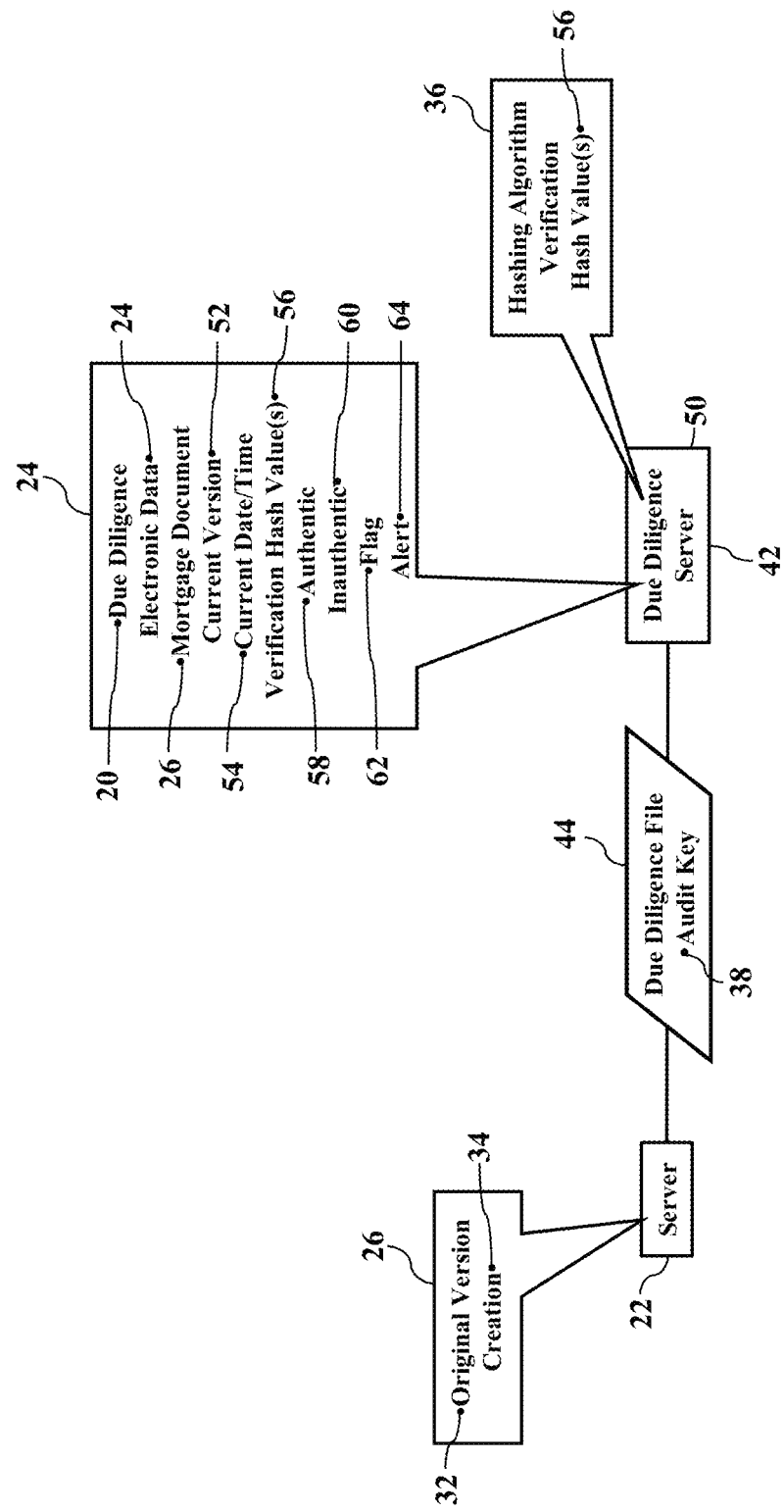

FIG. 2 illustrates a due diligence server 50. The due diligence server 50 operates on behalf of the auditor 42 (such as a buyer, seller, or governmental entity) to perform the due diligence 20. When the due diligence server 50 receives the due diligence file 44, the due diligence 20 may commence. For example, the due diligence server 50 may retrieve or receive the electronic data 24 representing a current version 52 of the electronic mortgage document 26. As the reader may understand, the current version 52 (perhaps as of a current date and time 54) may different, perhaps only slightly, from the original version 32 generated or saved approximately at the creation 34. Any difference between the original version 32 and the current version 52 may indicate an unintentional, or intentional, change to the electronic mortgage documents 26. Such a slight change is conventionally difficult to discern, especially by human inspection.

Exemplary embodiments, though, automate the due diligence 20. Exemplary embodiments may compare the cryptographic audit key(s) 38 to the current version 52 of the electronic mortgage documents 26. That is, the due diligence server 50 may independently hash the electronic data 24 representing the current version 52 of the electronic mortgage documents 26 (using the same cryptographic hashing algorithm 36) to generate one or more verification hash values 56. If the verification hash values 56 match the cryptographic audit keys 38 sent via the due diligence file 44, then the electronic mortgage document 26 has not changed since the date and time of creation 34. That is, the current version 52 of the electronic mortgage documents 26 is the same as the original version 32, unaltered, and thus authentic 58. However, if the verification hash values 56 (generated from hashing the current version 52 of the electronic mortgage documents 26) fail to match the cryptographic audit keys 38 incorporated into the due diligence file 44, then the electronic mortgage documents 26 have changed since the date and time of creation 34. The due diligence file 44, in other words, reveals an alteration that may indicate the current version 52 is inauthentic 60. Exemplary embodiments may thus generate a flag 62 or other alert 64 to initiate further due diligence investigation.

Figure 3:
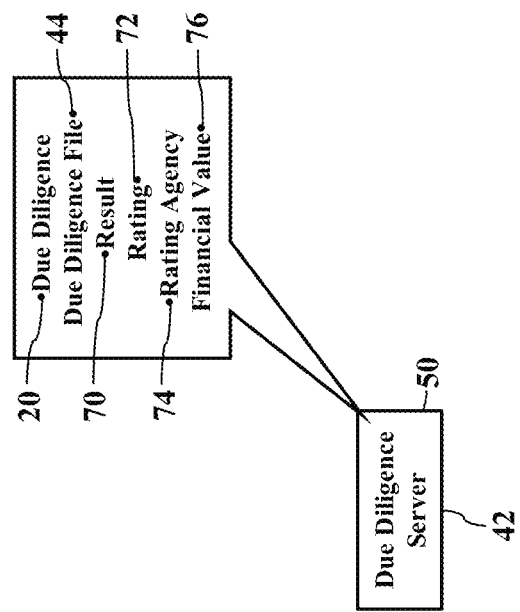

FIG. 3 further illustrates the due diligence 20. The due diligence server 50 inspects the data or information contained within, and/or referenced by, the due diligence file 44 to conduct the due diligence 20. The due diligence server 50 generates a result 70 of the due diligence 20. The result 70 may be as simple or as complicated as needed. For example, the result 70 of the due diligence 20 may be a rating 72. The rating 72 is usually with reference to some minimum or maximum value or scale. The rating 72 may be some grade or evaluation assigned by a rating agency 74 or other third party entity. The result 70 of the due diligence 20 may additionally or alternatively be a financial value 76. The result 70 may be incorporated into the due diligence file 44, or the result 70 may be separate data or information.

Figure 4:
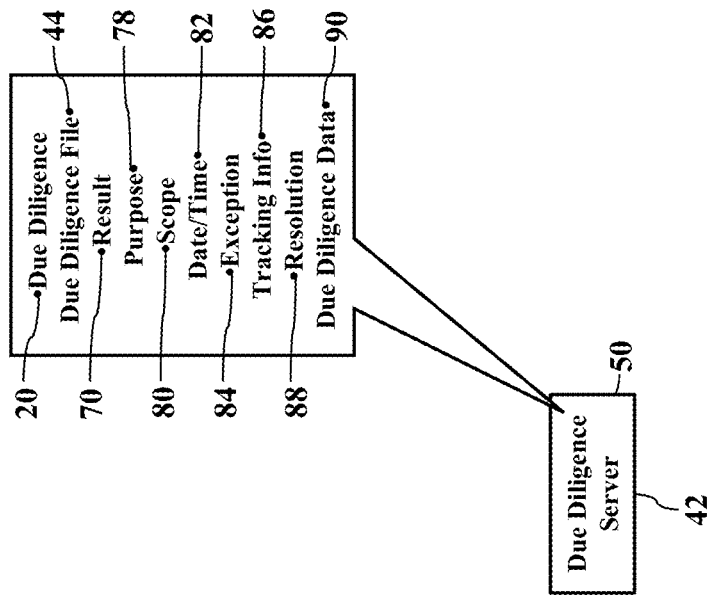

FIG. 4 further illustrates the due diligence file 44. As the due diligence server 50 performs the due diligence 20, the due diligence server 50 may augment the due diligence file 44. The due diligence server 50, for example, may add metadata or information describing a purpose 78 and scope 80 of the due diligence 20 at a date/time 82. The purpose 78 of the due diligence 20 may describe why the electronic mortgage documents 26 were audited or reviewed, such as describing a buyer/seller, broker/dealer, the party conducting the due diligence 20, a transaction or acquisition, transaction terms, and the result 70. The scope 80 may describe the collateral, the mortgage documents 26 reviewed, process and policies applied, valuation methodology, representations and warranties, and even indemnification. The due diligence file 44 may further include data describing any exceptions 84 to the due diligence 20, such as practice areas or procedures not reviewed or audited. Indeed, the due diligence file 44 may include tracking information (or tracking "info") 84 related to the exceptions 86, thus allowing future due diligence efforts to be calendared and scheduled for follow-up action. The due diligence file 44 may further include data describing resolutions 88 that resolve or modify the exceptions 86. The due diligence file 44, in other words, may include due diligence data 90 generated prior to performing the due diligence 20, generated during performance of the due diligence 20, and generated after performing the due diligence 20.

Figure 5:
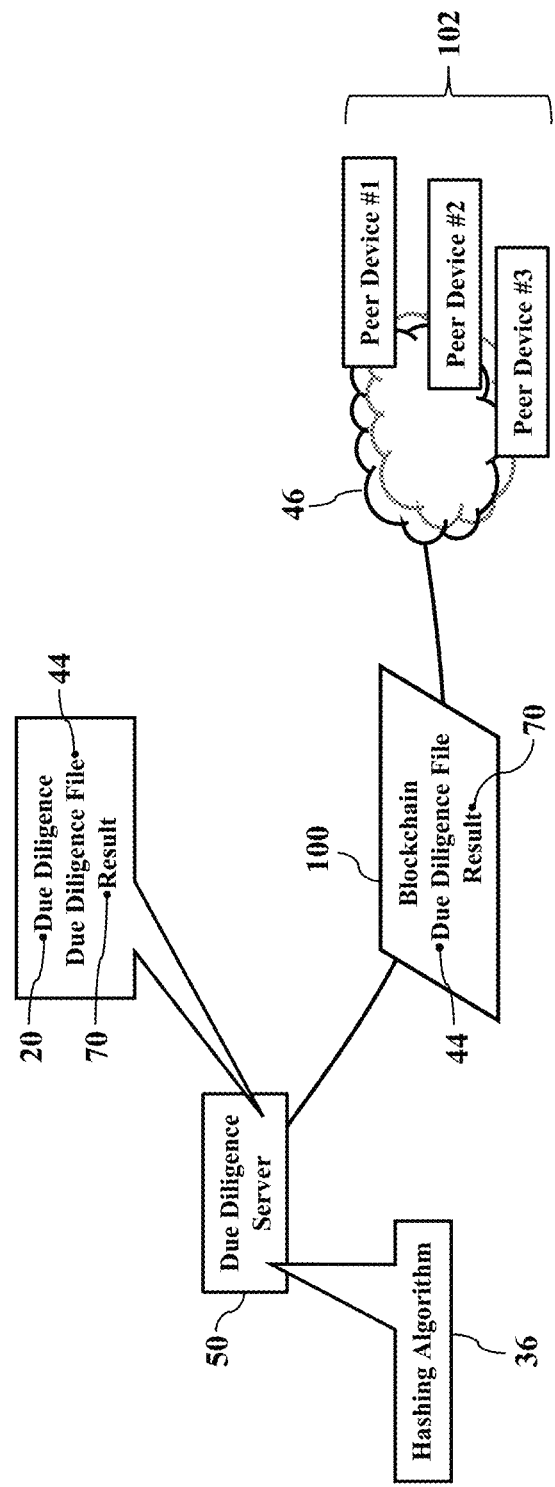

FIG. 5 illustrates due diligence records. Here exemplary embodiments may record the due diligence 20 as a record in a blockchain 100. As the reader may understand, the blockchain 100 is generally a digital ledger in which transactions are chronologically and/or publically recorded. The blockchain 100 is most commonly used in decentralized cryptocurrencies (such as Bitcoin). The blockchain 100, however, may be adapted to any chain or custody (such as the due diligence 20 conducted on the electronic mortgage document(s) 26). Indeed, there are many different mechanisms and configurations of the blockchain 100, and exemplary embodiments may be adapted to any version. Regardless, the due diligence server 50 may integrate the due diligence 20 into the blockchain 100 for distribution or publication to other devices 102. That is, the data representing the due diligence file 44 and/or the result 70 may be recorded in the blockchain 100 for historical documentation and reference. The due diligence server 50 may additionally or alternatively hash any of the due diligence file 44 and/or the result 70 (using the hashing algorithm 36) and integrate the digital signatures into the blockchain 100. The blockchain 100 thus provides a publication mechanism for tracking the due diligence 20 of the electronic mortgage document(s) 24. The due diligence 20 may thus be archived and accessed for future efforts that validate or verify the electronic mortgage document(s) 24.

Figure 6:
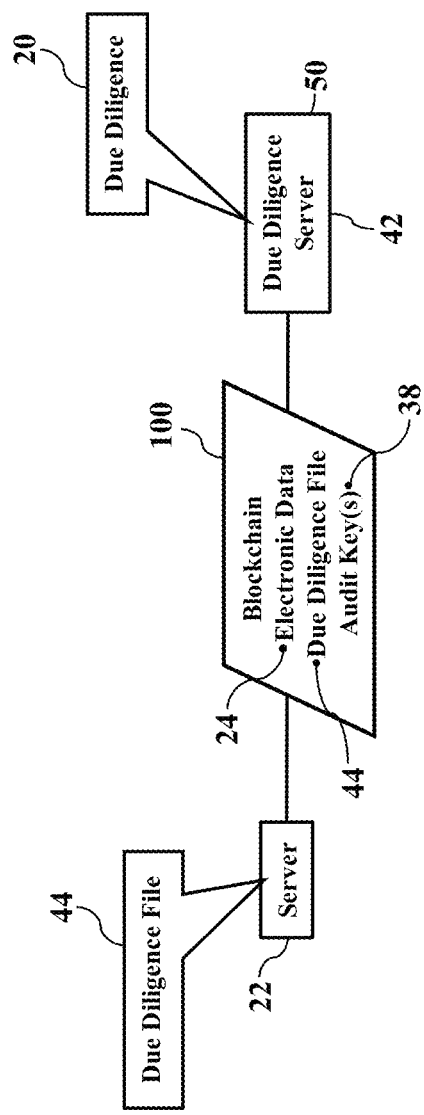

FIG. 6 further illustrates publication. Here exemplary embodiments may distribute the due diligence file 20 via the blockchain 100. When the server 22 creates the due diligence file 20, the server 22 may incorporate the due diligence file 44 as a record in the blockchain 100 for historical documentation and reference. The blockchain 100 may thus include any cryptographic hash values or digital signatures generated from the due diligence file 44 (such as the audit key(s) 38). While the server 22 may send the blockchain 100 to any destination address, FIG. 6 illustrates the due diligence server 50. That is, the due diligence server 50 may be a recipient of the blockchain 100. Because the blockchain 100 may contain the raw electronic data 24, the due diligence file 44, and/or their corresponding hash value(s) (such as the audit key(s) 38), the blockchain 100 may archive the informational basis for the due diligence 20.

Exemplary embodiments thus present elegant due diligence tools. Exemplary embodiments provide a cryptographic mechanism for conducting the due diligence 20 of the electronic mortgage documents 26. The entity conducting the due diligence 20 need only retrieve and hash the current version 52 and compare to the audit key(s) 38 (described by the due diligence file 44). If the digital signatures substantially or exactly match, then perhaps the due diligence 20 is complete and no further investigation is required. But if the current version 52 has changed, the digital signatures will differ, perhaps even substantially. Indeed, even a change to a single character in a single word can produce a noticeable difference in hash values. So, if the digital signatures are different, the current version 52 of the electronic mortgage documents 26 may fail an authentication (e.g., the authentic 58 or inauthentic 60 determination). The auditor 42 may thus simply and quickly discern whether the electronic mortgage documents 26 require additional investigative scrutiny. The blockchain 100 publically, or privately, archives the due diligence 20 for historical use and analysis.

Figure 7:
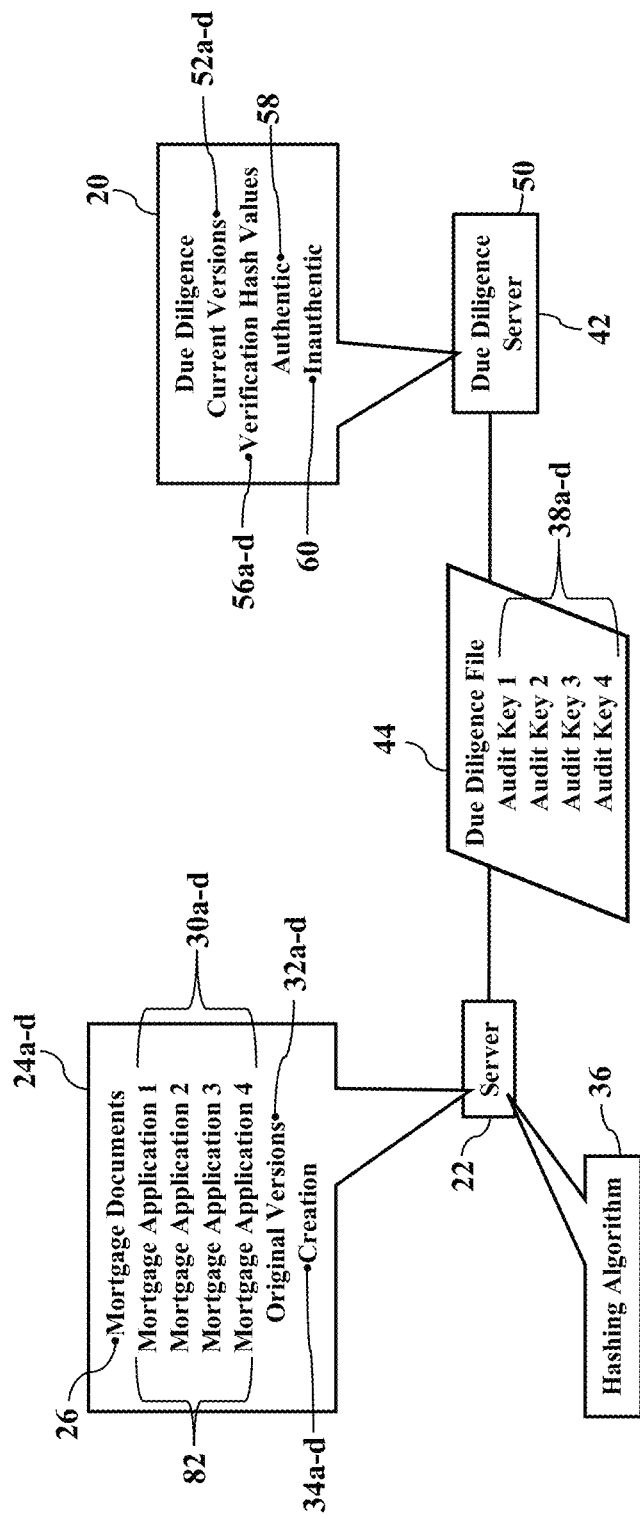

FIG. 7 further illustrates the due diligence file 44. Here the due diligence file 44 may include any or all of the electronic mortgage documents 26 from multiple electronic mortgage applications 30. Because exemplary embodiments are particularly useful for auditing securitized assets, a typical financial product may include hundreds or even thousands of mortgages. The due diligence file 44 may thus include the electronic data 24 representing hundreds or thousands of electronic mortgage documents 26 associated with hundreds or thousands of electronic mortgage applications 30. These hundreds or thousands of documents are simply too cumbersome to illustrate. FIG. 7 thus simply illustrates four (4) electronic mortgage applications 30*a-d* associated with four (4) different properties and/or applicants. The due diligence file 44 may thus include or reference the electronic data 24*a-d* representing all the mortgage documents 26 in the four (4) electronic mortgage applications 30*a-d*. The server 22 sends the due diligence file 44 to the auditor 42 for the due diligence 20. If the due diligence server 50 matches any corresponding cryptographic audit key 38*a-d* (generated from hashing the original versions 32*a-d*) to the current versions 52*a-d* of the electronic mortgage applications 30*a-d*, then the electronic data 24*a-d* is unaltered and authentic 58. However, if any verification hash value 56*a-d* fails to match the corresponding cryptographic audit key 38*a-d*, then the corresponding electronic data 24*a-d* has changed since its date and time of creation 34*a-d*. Exemplary embodiments may thus escalate the due diligence 20 for additional auditing procedures.

Figure 8:
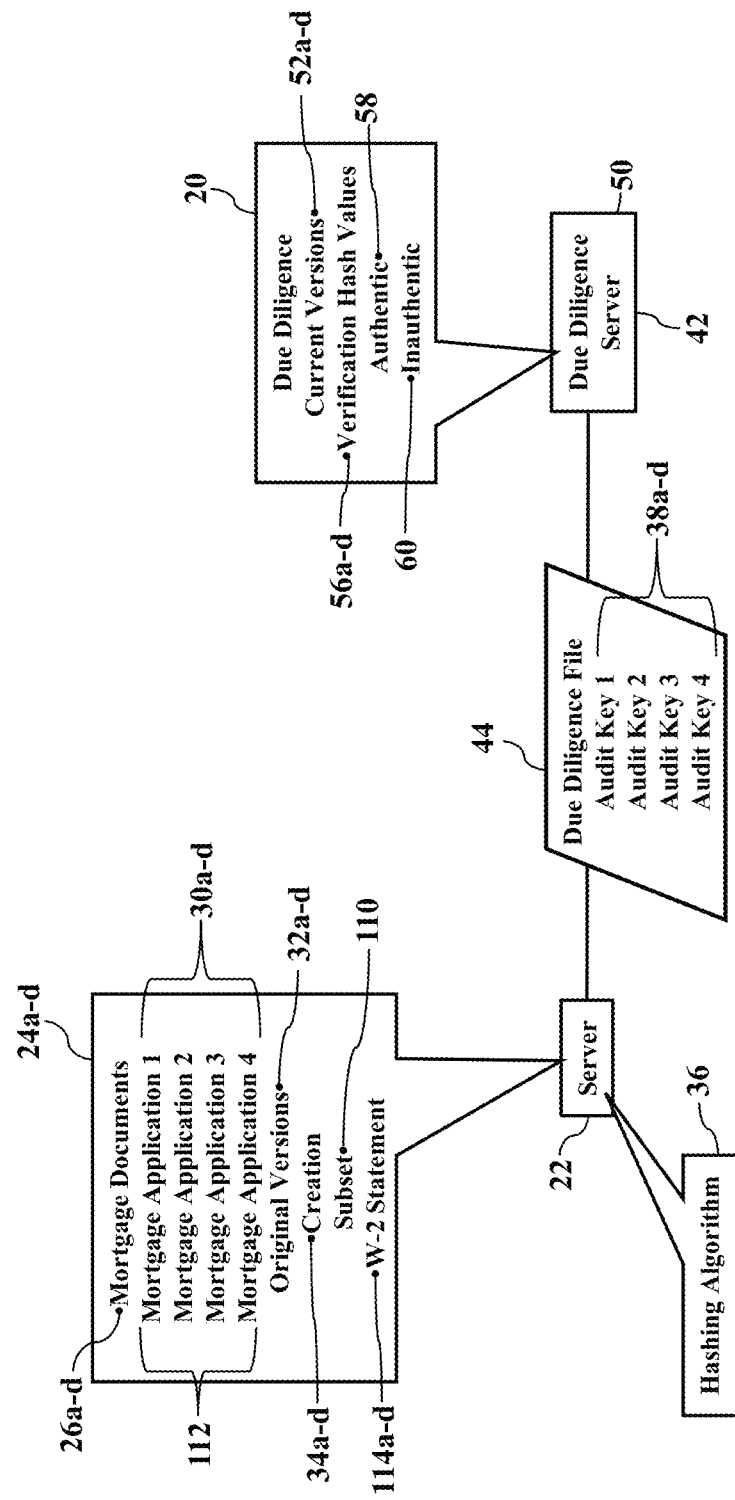

FIG. 8 also illustrates the due diligence file 44. Here, though, the due diligence file 44 may only include a subset 110 of the electronic mortgage documents 26 from a collection 112 of multiple electronic mortgage applications 30. Because each electronic mortgage application 30 may include many documents and/or hundreds of pages, a full due diligence investigation of each page/document may not be feasible or cost effective. Exemplary embodiments may thus limit the due diligence 20 and review or audit only a sample data set. The due diligence file 44 may thus contain the electronic data 24*a-d* representing a sample of the electronic mortgage documents 26 contained within, or associated with, multiple and different applicants and/or properties. FIG. 8 thus illustrates another simple example in which the due diligence 20 only reviews IRS W-2 statements 114*a-d* electronically plucked or sifted from the four (4) electronic mortgage applications 30*a-d*. That is, the due diligence file 44 may contain the electronic data 24*a-d* representing the IRS W-2 statements 114*a-d* copied or isolated from the corresponding electronic mortgage application 30*a-d*. The server 22 sends the due diligence file 44 to the auditor 42 for the due diligence 20. If the due diligence server 50 matches any corresponding cryptographic audit key 38*a-d* (generated from hashing the original versions 32*a-d* of the IRS W-2 statements 114*a-d*) to the current version 52*a-d*, then the electronic data 24*a-d* is unaltered and authentic 58. However, if any verification hash value 56*a-d* fails to match the corresponding cryptographic audit key 38*a-d*, then the corresponding applicant's IRS W-2 statement 114*a-d* has changed since its date and time of creation 34*a-d*. Exemplary embodiments may thus escalate the due diligence 20 for additional scrutiny.

Exemplary embodiments thus present a simple and effective due diligence mechanism. Cryptographic hashing may be used to make quick due diligence decisions. If an entity conducting the due diligence 20 matches cryptographic digital signatures representing different versions of the electronic mortgage documents 26, then perhaps the due diligence 20 is complete and no further investigation is required. But if the current version 52 has changed, the digital signatures will differ, perhaps even substantially. Indeed, even a change to a single character in a single word can produce a noticeable difference in hash values. So, if the digital signatures are different, the current version 52 of the electronic mortgage documents 26 may fail an authentication (e.g., the authentic 58 or inauthentic 60 determination). The auditor 42 may thus simply and quickly discern whether the electronic mortgage documents 26 require additional investigative scrutiny. The auditor 42 may then use the blockchain 100 to archive the due diligence 20 for historical use and analysis.

Exemplary embodiments may be applied to any electronic document. Most readers are thought familiar with mortgage documents. This disclosure thus mainly explains the due diligence 20 of mortgage documents. Exemplary embodiments, though, may be applied to the due diligence 20 of any electronic data representing any document.

Figure 9:
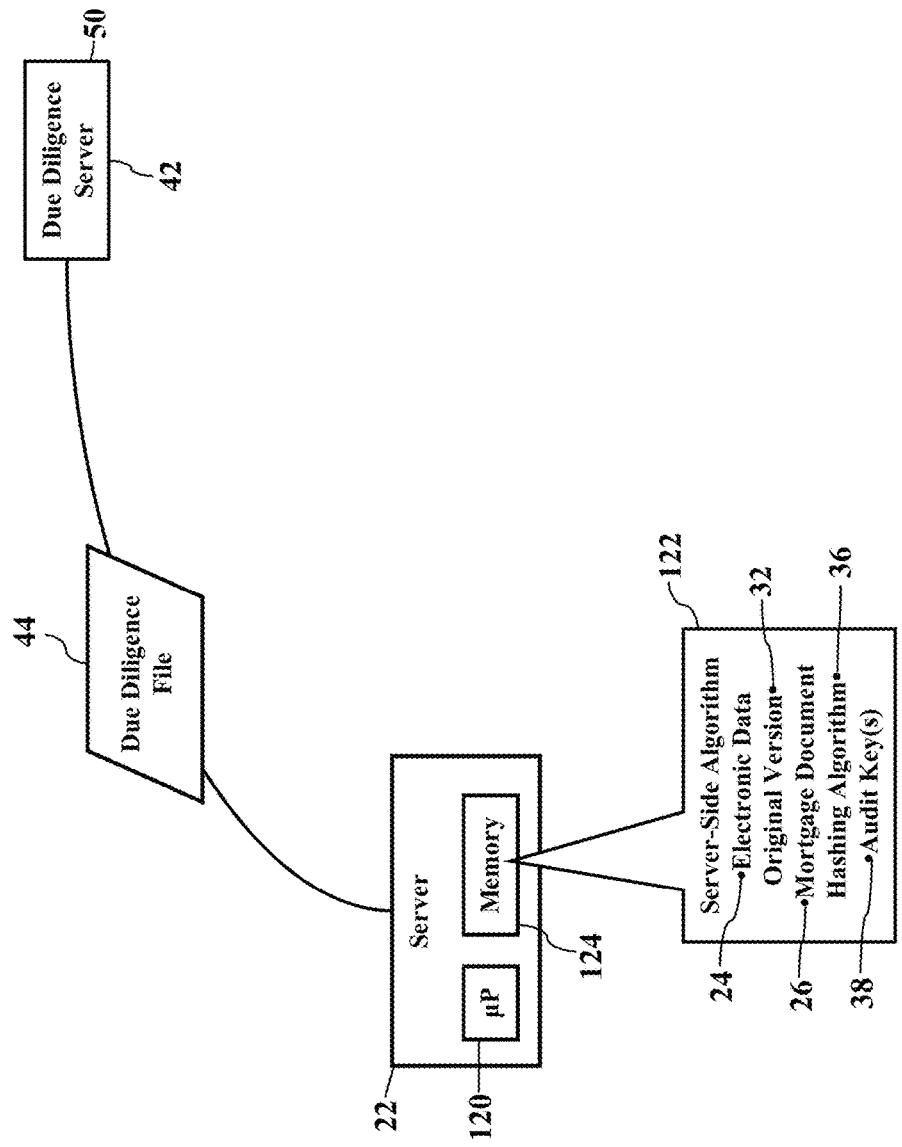
FIGS. 9-10 are detailed illustration of an operating environment, according to exemplary embodiments.
Figure 10:
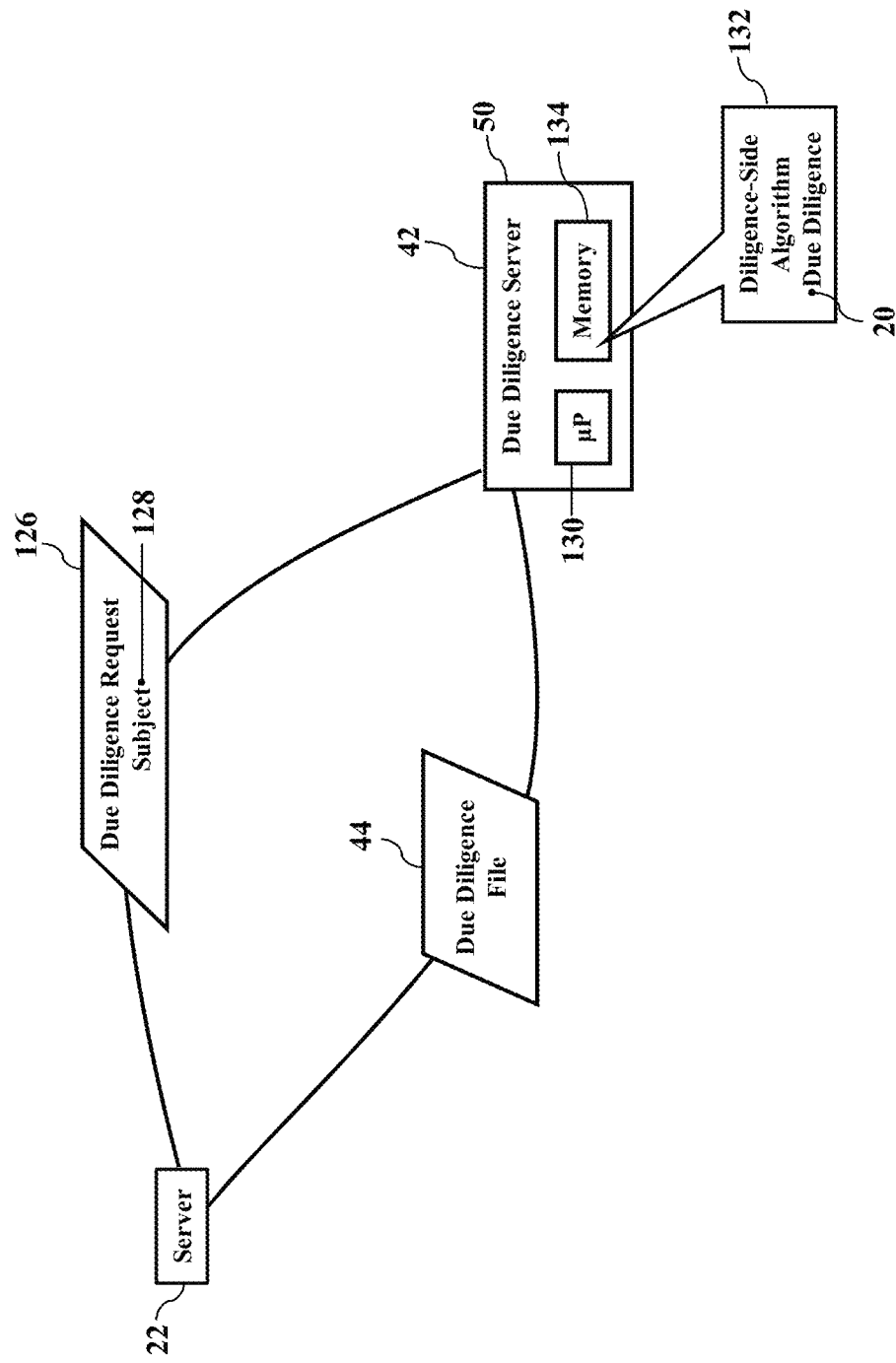

FIGS. 9-10 are detailed illustration of an operating environment, according to exemplary embodiments. FIG. 9 illustrates the server 22 communicating with the due diligence server 50 (via the communications network 46 illustrated in FIGS. 1 and 5). The server 22 may have a processor 120 (e.g., "μP"), application specific integrated circuit (ASIC), or other component that executes a server-side algorithm 122 stored in a local memory device 124. The server-side algorithm 122 includes instructions, code, and/or programs that cause the server 22 to perform operations, such as hashing the electronic data 24 representing the original version 32 of the electronic mortgage document 26 (using the hashing algorithm 36) to generate the audit key(s) 38 and the due diligence file 44 (as the above paragraphs explained). The server-side algorithm 122 may also instruct or cause the server 22 to send the due diligence file 44 to the due diligence server 50. The server-side algorithm 122 may also instruct or cause the server 22 to send the due diligence file 44 to any IP address associated with any network destination or device.

Exemplary embodiments may use any hashing function. Many readers may be familiar with the SHA-256 hashing algorithm that generates a 256-bit hash value. Exemplary embodiments obtain or retrieve the electronic data 24 representing the original version 32. The SHA-256 hashing algorithm acts on the electronic data 24 to generate a 256-bit hash value as the cryptographic audit key 38. The audit key 38 is thus a digital signature that uniquely represents the electronic data 24. There are many hashing algorithms, though, and exemplary embodiments may be adapted to any hashing algorithm.

FIG. 10 illustrates due diligence instructions. When the auditor 42 wishes to perform the due diligence 20, the due diligence server 50 may send a due diligence request 126. The due diligence request 126 may include data or information that specifies a subject 128 of the due diligence 20. The subject 128 may be broadly or narrowly specified to ensnare a single document, a single mortgage application, multiple documents from the single mortgage application, the single document from multiple mortgage applications, or multiple documents from the multiple mortgage applications. In general, then, the due diligence request 126 may specify a document range identifying the document(s) to be reviewed and/or a property/applicant range identifying names, properties, and/or mortgage application(s) to be audited for the due diligence 20. The due diligence server 50 may have a processor 130 (e.g., "μP"), application specific integrated circuit (ASIC), or other component that executes a diligence-side algorithm 132 stored in a local memory device 134. The diligence-side algorithm 132 includes instructions, code, and/or programs that cause the due diligence server 50 to perform operations, such as generating the due diligence request 126 and sending the due diligence request 126 to the IP address associated with the server 22. The server 22 thus generates the due diligence file 44 as a response to the due diligence request 126. The server 22 and the due diligence server 50 may thus cooperate to perform the due diligence 20 of the electronic mortgage documents 26 based on the due diligence file 44.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. The server 22 and the due diligence server 50 may have network interfaces to the communications network 46, thus allowing collection and retrieval of information. The information may be received as packets of data according to a packet protocol (such as the Internet Protocol). The packets of data contain bits or bytes of data describing the contents, or payload, of a message. A header of each packet of data may contain routing information identifying an origination address and/or a destination address.

Figure 11:
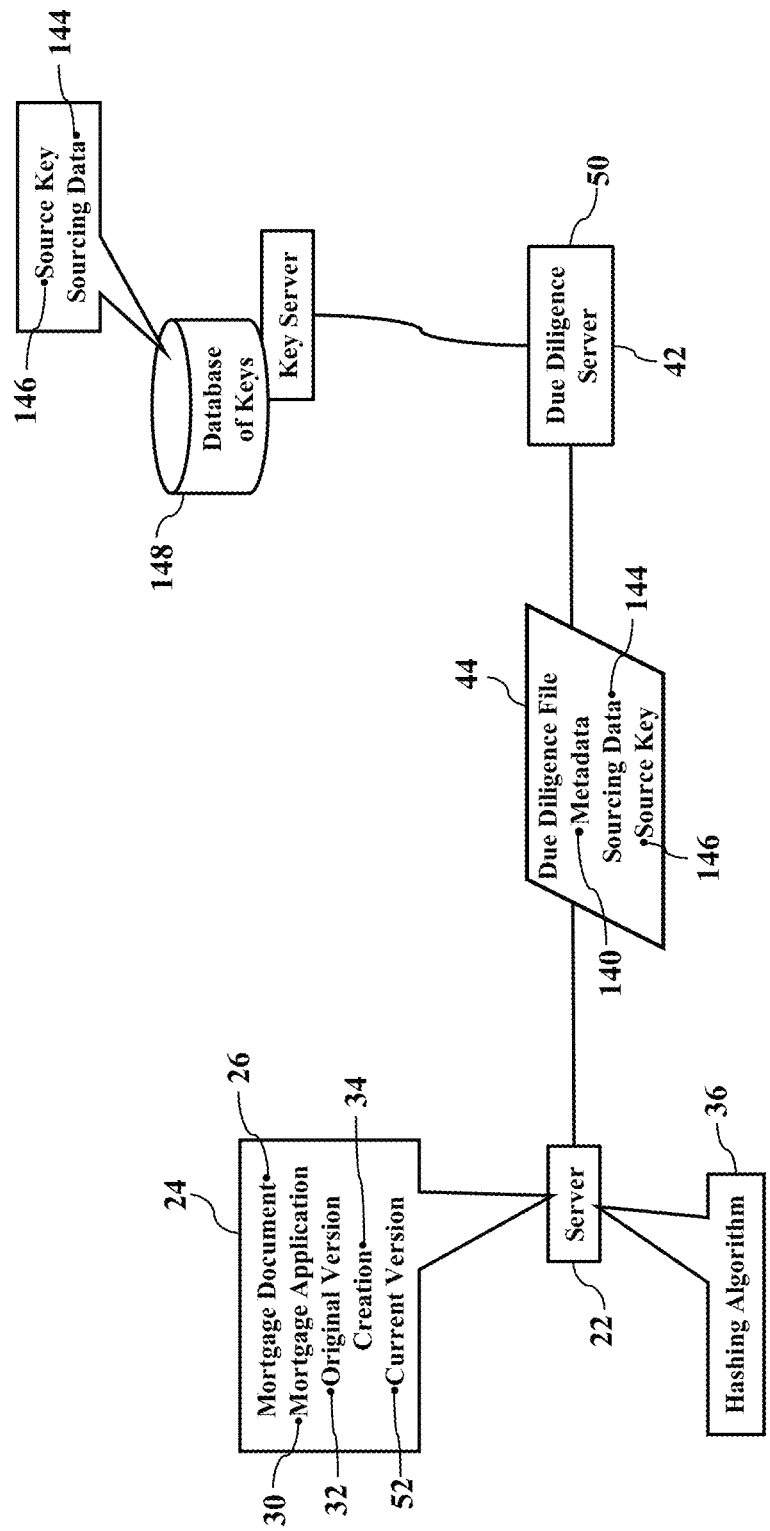
FIGS. 11-12 illustrate metadata, according to exemplary embodiments.
Figure 12:
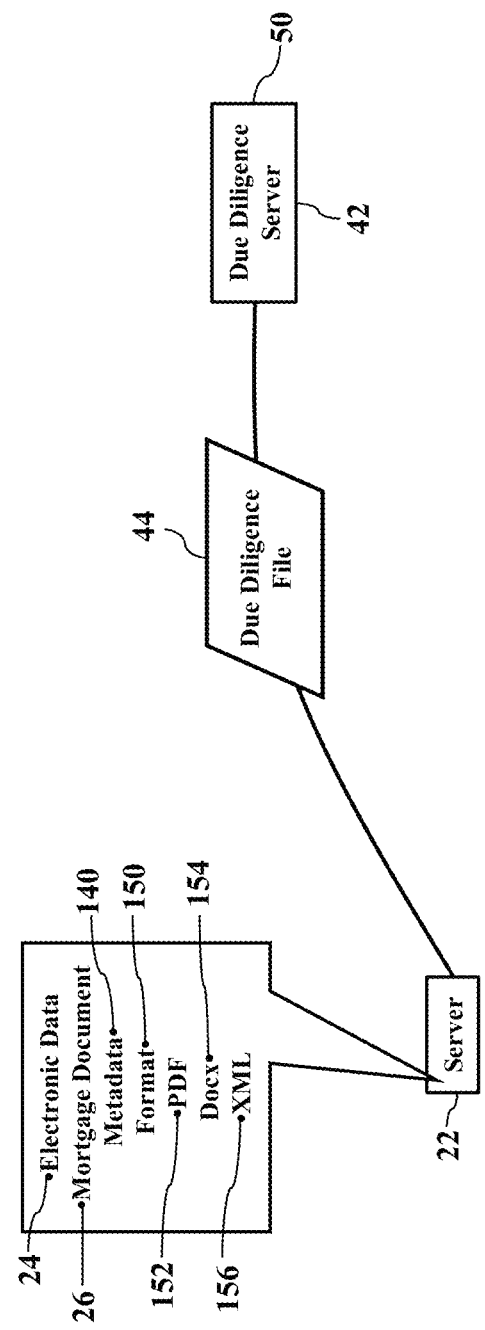

FIGS. 11-12 illustrate metadata 140, according to exemplary embodiments. Here the due diligence file 44 may include the electronic metadata 140 associated with the electronic mortgage document(s) 26 and/or the mortgage application(s) 28. The metadata 140 may describe any document(s) contained within, or associated with, the electronic mortgage document(s) 26 and/or the mortgage application(s) 28. For example, the metadata 140 may describe the creation 34 (such as {"CreationTime":"2012-05-07T11: 12:32"}). The metadata 140 may describe the applicant, the property, a location (such as GPS information at the creation 34 or a property address), word/character count, and an abstract describing or summarizing the electronic mortgage document(s) 26. The metadata 140 may also include one or more keywords associated with any of the electronic mortgage document(s) 26. The metadata 140 may also include a file hierarchy where the electronic mortgage document(s) 26 is/are stored and/or a network address for retrieval. The network address, for example, may be associated with a source server or other machine locally or remotely storing the electronic mortgage document(s) 26. The metadata 140 may also include structural details, such as file size, page numbering, chapter organization, and image data. Other metadata 140 may describe approved users (such as administrator and user permissions or identities) and digital rights management (or "DRM"). The metadata 140 may be formatted according to any standard. The due diligence file 44 may thus include any metadata 140 associated with the electronic mortgage document(s) 26.

FIG. 11 also illustrates sourcing data 144. The sourcing data 144 may also be a type of the metadata 140 that is associated with the electronic mortgage document(s) 26 and/or the mortgage application(s) 28. The sourcing data 144 specifies from where the electronic mortgage document(s) 26 and/or the mortgage application(s) 28 may be obtained. That is, the sourcing data 144 specifies a network location, address, website, and/or other information associated with a networked device or server that stores the original version 32 and/or the current version 52. The sourcing data 144 may be as simple or detailed as needed to ease access. The sourcing data 144, for example, may be defined as [{"Source":{"Name": "Wells Fargo System XXX"} {"ID":"YYY"}, {"Access Link":"https://foo.wellsfargo.com"} . . . ] and textually written or encoded as the metadata 140. The sourcing data 144 may thus specify one or more uniform resource locators (URLs) as website links from where the corresponding electronic mortgage document 26 (document identifier "ID":YYY") may be queried and retrieved. The sourcing data 144, however, may be anonymized, thus not hiding or not revealing the responsible lender, data owner, or contractor [{"Source":{"Name": "Anonymous" }, {"ID":"YYY"}, {"Access Link":"https:// 2690:a280:7751:5507:b93z:59fg:44lp:c55q"} . . . ], perhaps thus merely identifying an IP address. The sourcing data 144 may also be redacted to additionally or alternatively conceal the sourcing entity. Regardless, the sourcing data 144 may thus be populated by an originator or creator of the electronic mortgage document 26. The sourcing data 144 may also be populated by an owner of the original version 32 and/or the current version 52 (such as lender of contractor). The sourcing data 144 may thus be added to any existing metadata 140 to accompany the due diligence file 44.

FIG. 11 also illustrates a source key 146. Once the sourcing data 144 is determined and/or retrieved, the sourcing data 144 may be hashed using the cryptographic hashing algorithm 36 to generate one or more cryptographic source keys 146. The cryptographic source key 146 may then incorporated into the due diligence file 44, and/or the cryptographic source key 146 may be distributed via the one or more blockchains 100 (as illustrated with reference to FIG. 6). Once any recipient receives the due diligence file 44 and/or the cryptographic source key 146, the recipient may reverse lookup the sourcing data 144 to retrieve the corresponding electronic mortgage document 26. That is, the due diligence server 50 may query a database 148 of keys to convert or translate the source key 146 back into its corresponding sourcing data 144. Sourcing discovery and retrieval are more fully explained in U.S. application Ser. No. 15/456,067 filed Mar. 10, 2017 and incorporated herein by reference in its entirety.

Exemplary embodiments thus include more simple due diligence tools. Exemplary embodiments may include the sourcing data 144 in the virtual due diligence file 44. Exemplary embodiments may also cryptographically hash the sourcing data 144 to generate the source key 146 for distribution via the blockchain(s) 100. Any recipient of the blockchain 100 may then simply and quickly convert the source key 146 back into the corresponding sourcing data 144. The due diligence server 50, for example, may quickly and easily use a query operation to determine the network source storing any mortgage document. The auditor need only translate the source key 146 to easily retrieve mortgage documents for auditing and due diligence purposes.

FIG. 12 illustrates formatting. Here the electronic data 24 representing the metadata 140 may describe one or more formats 150. Most readers, for example, are thought familiar with a portable document format ("PDF") 152, the MICROSOFT® WORD® extensible markup language extension ("docx") 154, and/or the extensible markup language ("XML") 156. Exemplary embodiments, though, may be applied to any file formatting and/or specification. The format 150 may be proprietary, free, unpublished, and/or open. The format 150 may be designed for images, containers, audio, video, text, subtitles, control characters, and encoding schemes. The format 150 may be HTML, vector graphics, source code, text files, syntax, and software programming. Whatever the format 150, exemplary embodiments may retrieve the electronic data 24 representing the format 150 of any electronic mortgage document 26. The due diligence file 44 may thus include any metadata 140 associated with the format 150 of the electronic mortgage document(s) 26.

Figure 13:
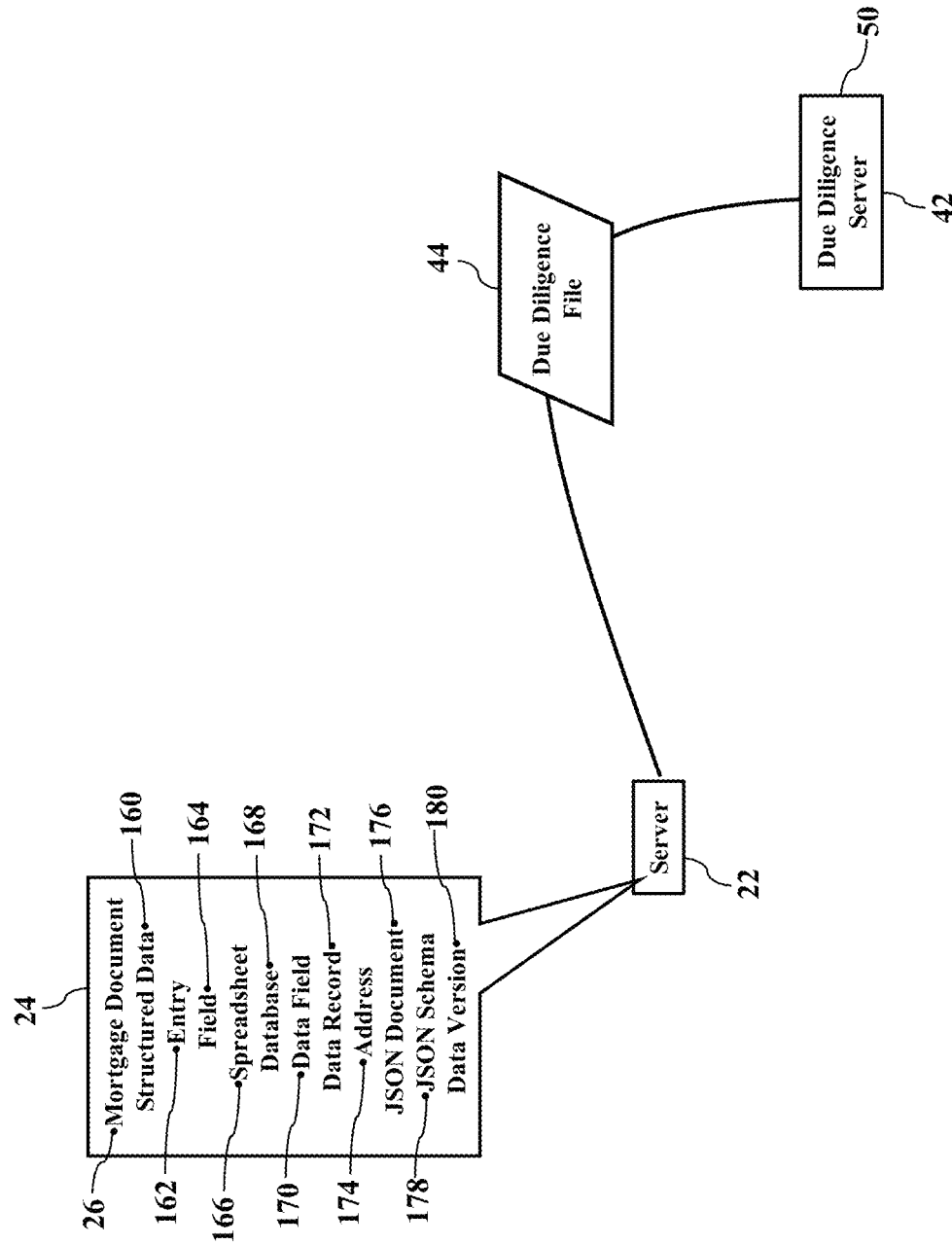
FIG. 13 illustrates structured data, according to exemplary embodiments.

FIG. 13 illustrates structured data 160, according to exemplary embodiments. As the reader may understand, the electronic data 24 representing the electronic mortgage document 26 may be the structured data 160. That is, the structured data 160 may be organized (such as an entry 162 or database field 164 in a relational spreadsheet 166 or database 168), contained within a fixed data field 170 or data record 172, and/or be addressable via a network or memory address 174. Again referencing the electronic mortgage document 26, the structured data 160 may be organized according to the JavaScript Object Notation (or "JSON"). As the JavaScript Object Notation is a known format for structuring data, the JSON format need not be explained in detail. Suffice it to say that at least some of the electronic data 24 representing the electronic mortgage document 26 and/or the due diligence file 44 may be a JSON document 176 having the structured data 160 arranged as fields, formatted according to a JSON schema 178.

Exemplary embodiment may thus incorporate a data version 180 in the due diligence file 44. For example, if the electronic mortgage document 26 and/or the due diligence file 44 is the JSON document 176, then the data version 180 may be the structured data 160 arranged or formatted according to the JSON schema 178. Exemplary embodiments may thus retrieve and incorporate the data version 180 in the due diligence file 44.

Figure 14:
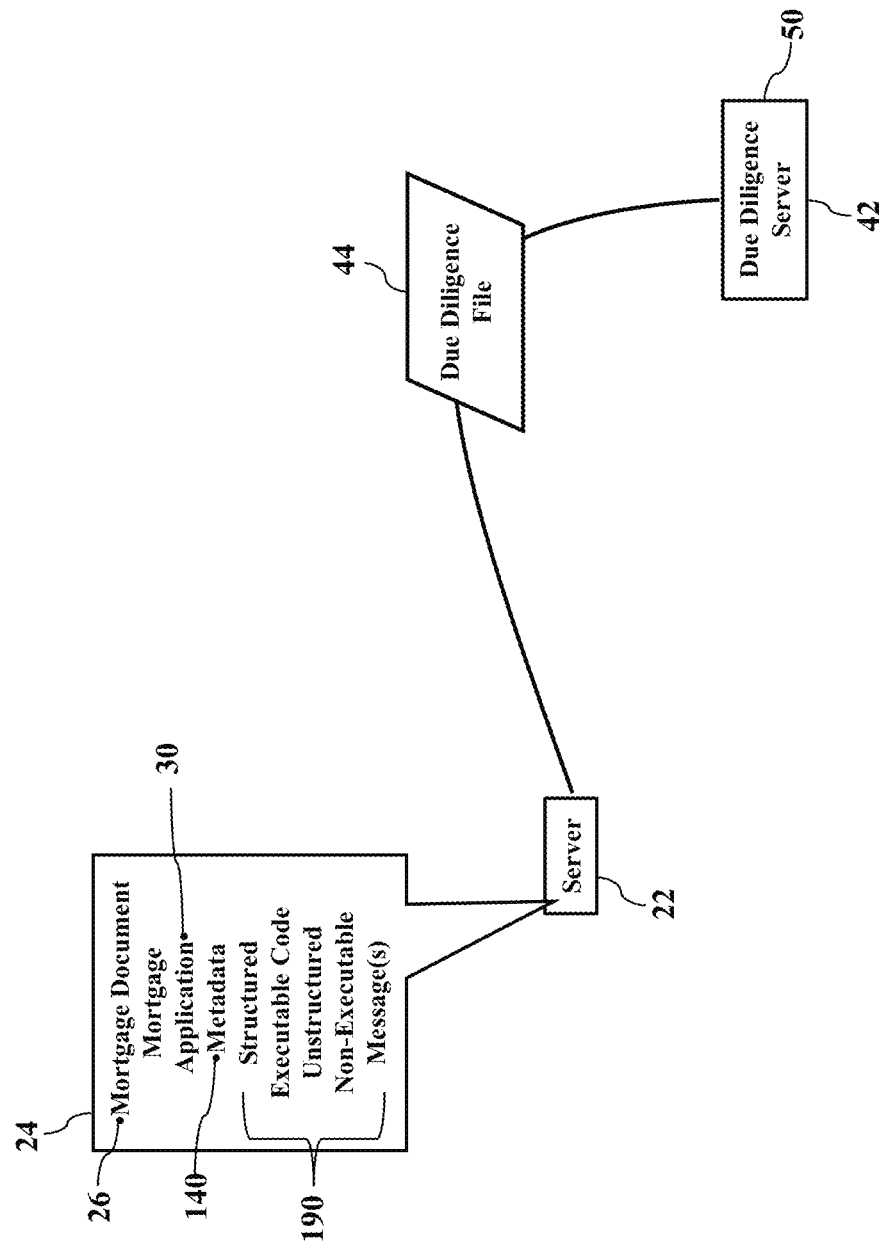
FIG. 14 illustrates instructions, according to exemplary embodiments.

FIG. 14 illustrates instructions 190, according to exemplary embodiments. Here the due diligence file 44 may include the instructions 190. While exemplary embodiments may be applicable to any instructions, the instructions 190 may be structured (such as executable code), unstructured instructions (such as non-executable commentary lines in code, such as English language "do thing 1, then thing 2, then thing 3"). Other instructions 190 may include any messages (such as "When this document is accessed, POST to the URL http://some.target.url"). Exemplary embodiments may thus retrieve and incorporate the instructions 190 into the due diligence file 44.

Figure 15:
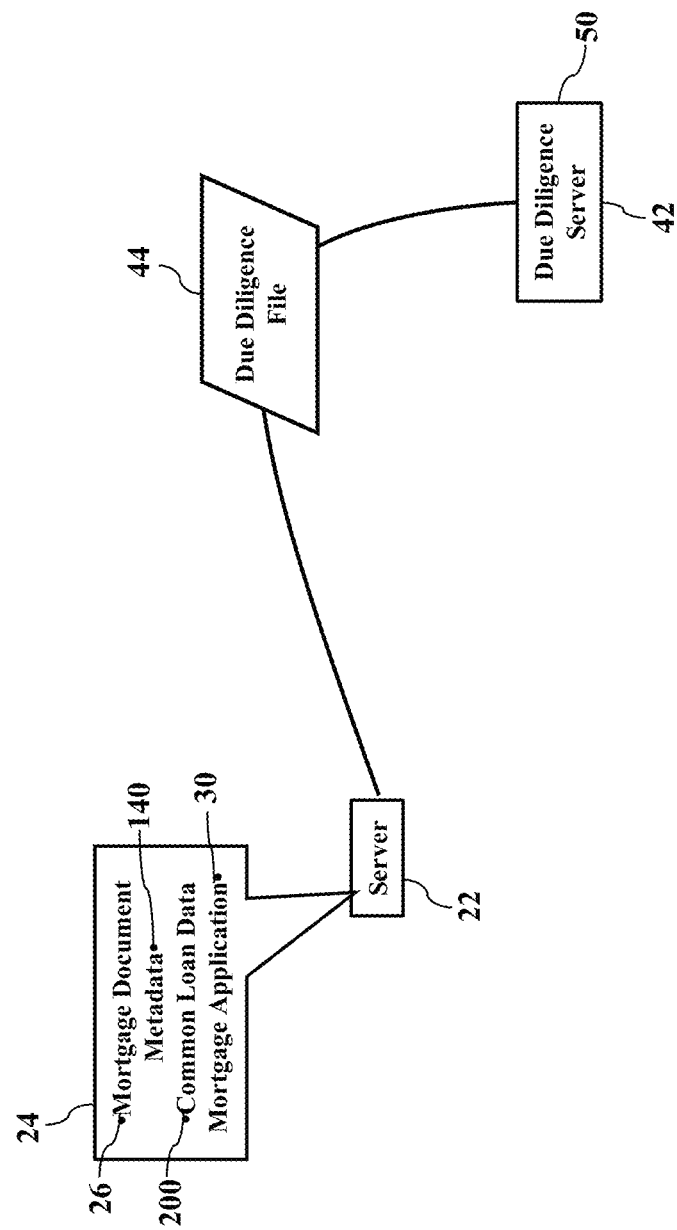
FIG. 15 illustrates common loan data, according to exemplary embodiments.

FIG. 15 illustrates common loan data 200, according to exemplary embodiments. Here the due diligence file 44 may include data or information that is common or applicable to each electronic mortgage document 26 described, referenced, or included within the due diligence file 44. For example, each electronic mortgage document 26 may be associated with the metadata 140 describing a common geographic location (e.g., street, city, state, and/or ZIP). The common loan data 200 may additionally or alternatively specify a single or common document or page (again, such as the IRS W-2 statement 114 included in each electronic mortgage application 30, as explained with reference to FIG. 8). Similarly, the common loan data 200 may also include or describe a financial lender (such as WELLS FARGO® or BANK OF AMERICA® offering, evaluating, and/or processing the electronic mortgage applications 30. Whatever the common loan data 200 describes, exemplary embodiments may incorporate the common loan data 200 into the due diligence file 44.

Figure 16:
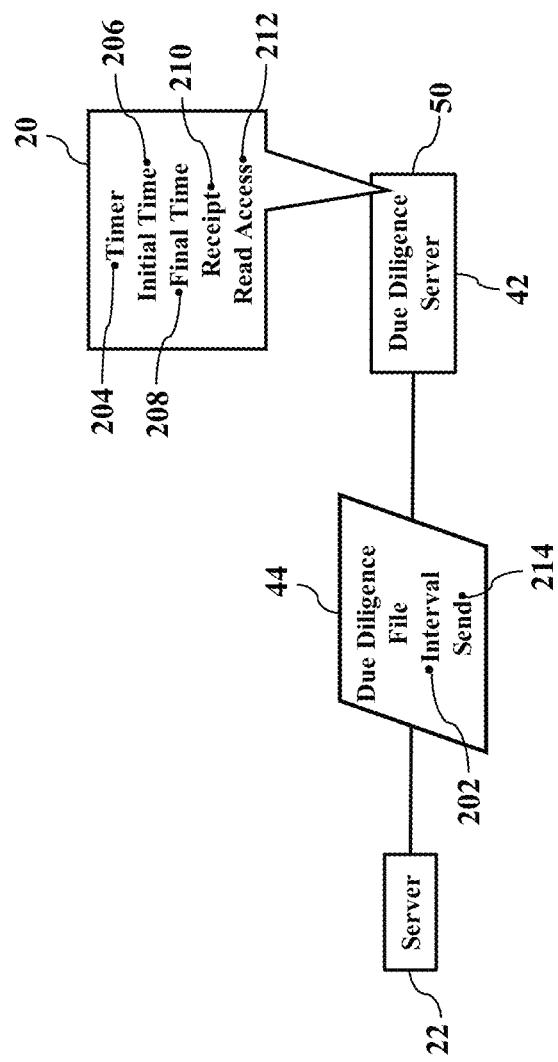
FIG. 16 illustrates a timing requirement, according to exemplary embodiments.

FIG. 16 illustrates a timing requirement, according to exemplary embodiments. Here the due diligence file 44 may include data or information specifying a due diligence interval 202 of time in which the due diligence 20 must be commenced and/or completed. The due diligence file 44 may thus cause the due diligence server 50 to call or invoke a timing mechanism (such as a timer 204) that begins counting up, or down, from an initial time 206 to a final time 208. If the due diligence interval 202 of time expires prior to commencement or completion of the due diligence 20, exemplary embodiments may decline further access to, and/or read usage of, the due diligence file 44. The due diligence interval 202 of time may thus be a time box or window that increments from a date/time of receipt 210, or at date/time of initial read access 212, by the due diligence server 50. The due diligence interval 202 of time may additionally or alternatively increment at a date/time of sending 214 the due diligence file 44 from the server 22. The due diligence file 44 may have additional configuration options that further define the access or usage conditions related to the auditing interval 202 of time.

Figure 17:
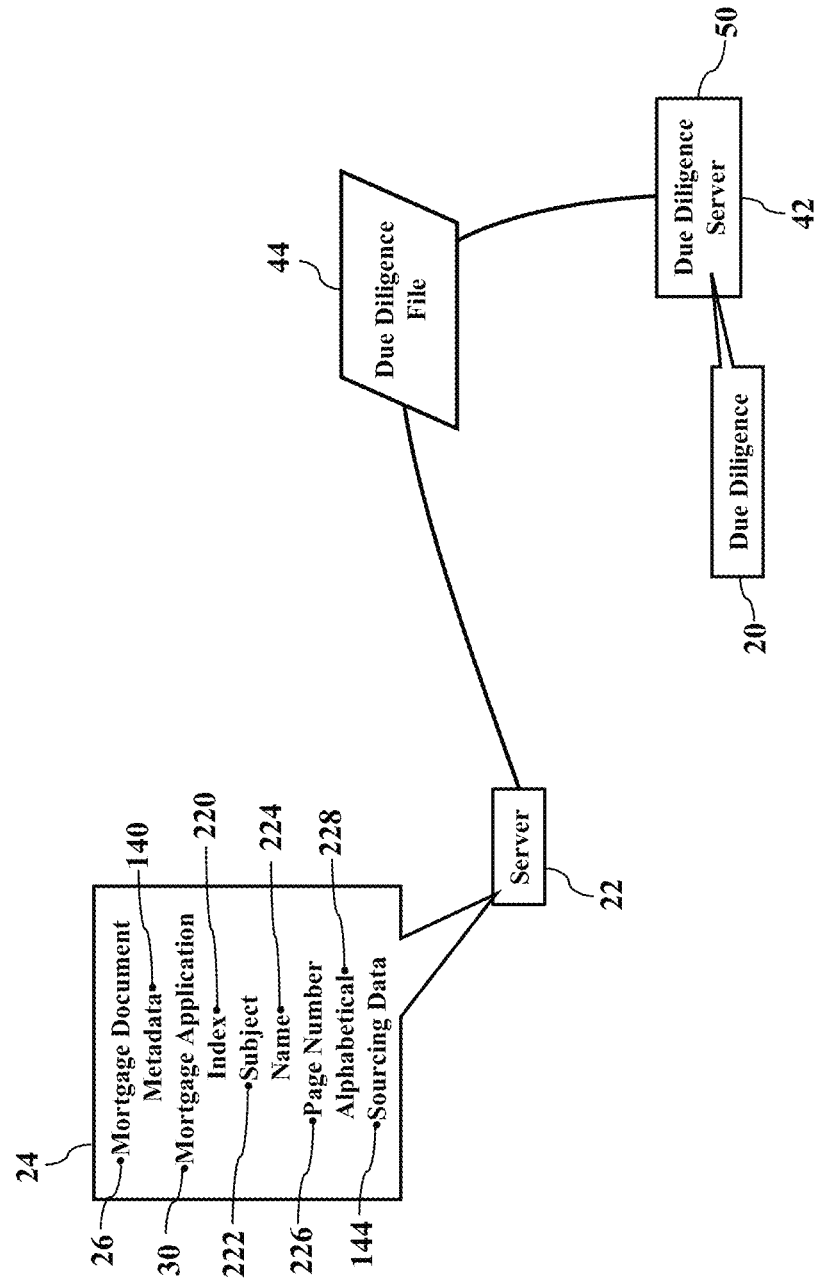
FIG. 17 illustrates an index, according to exemplary embodiments.

FIG. 17 illustrates an index 220, according to exemplary embodiments. Here the due diligence file 44 may include the index 220. The index 220 may list or describe any or of all the electronic mortgage documents 26 that are included within, or referenced by, the due diligence file 44. Because the due diligence file 44 may contain many different and separate documents, the index 220 may be provided as a courtesy to the auditor 42 performing the due diligence 20. Indeed, the due diligence request 126 (explained with reference to FIG. 10) may even require the index 220. The index 220 may be generated from the electronic data 24 representing the electronic mortgage documents 26. The index 220, for example, may be generated from the metadata 140 associated with the electronic mortgage documents 26 and/or the mortgage application(s) 30. The index 220 may be also arranged by topical subject 222, document name 224, and/or page number 226 to promote auditing efforts. The index 220 may additionally or alternatively be alphabetically arranged 228 to aid human search and retrieval. The index 220 may even describe and/or locate the metadata 140 associated with each electronic mortgage document 26. The index 220 may also describe the sourcing data 144 specifying the storage/retrieval location for each electronic mortgage document 26. When the auditor 42 (such as the due diligence server 50) receives the due diligence file 44, the index 220 permits easy machine or user access to the informational components within the due diligence file 44.

Figure 18:
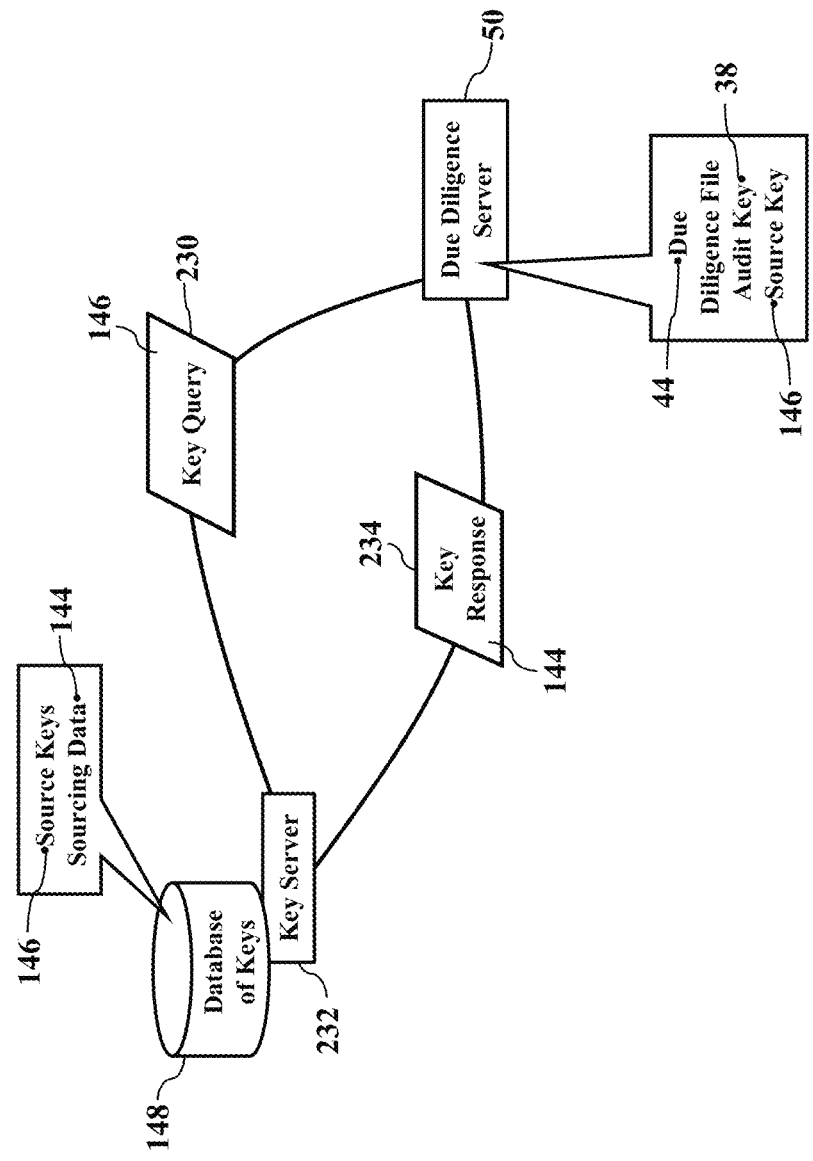
FIGS. 18-20 illustrate sourcing, according to exemplary embodiments.
Figure 19:
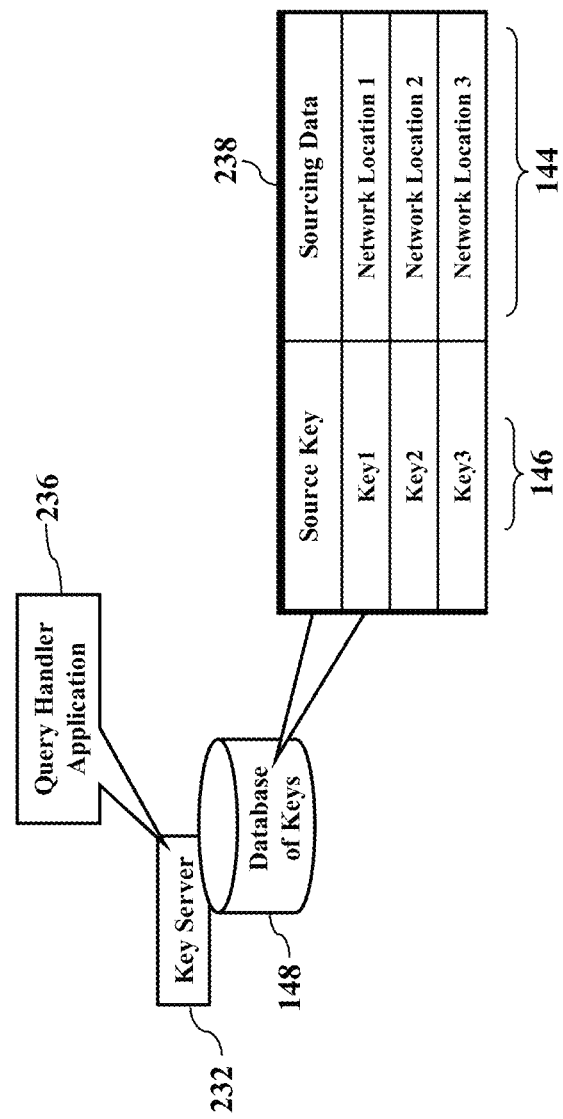
Figure 20:
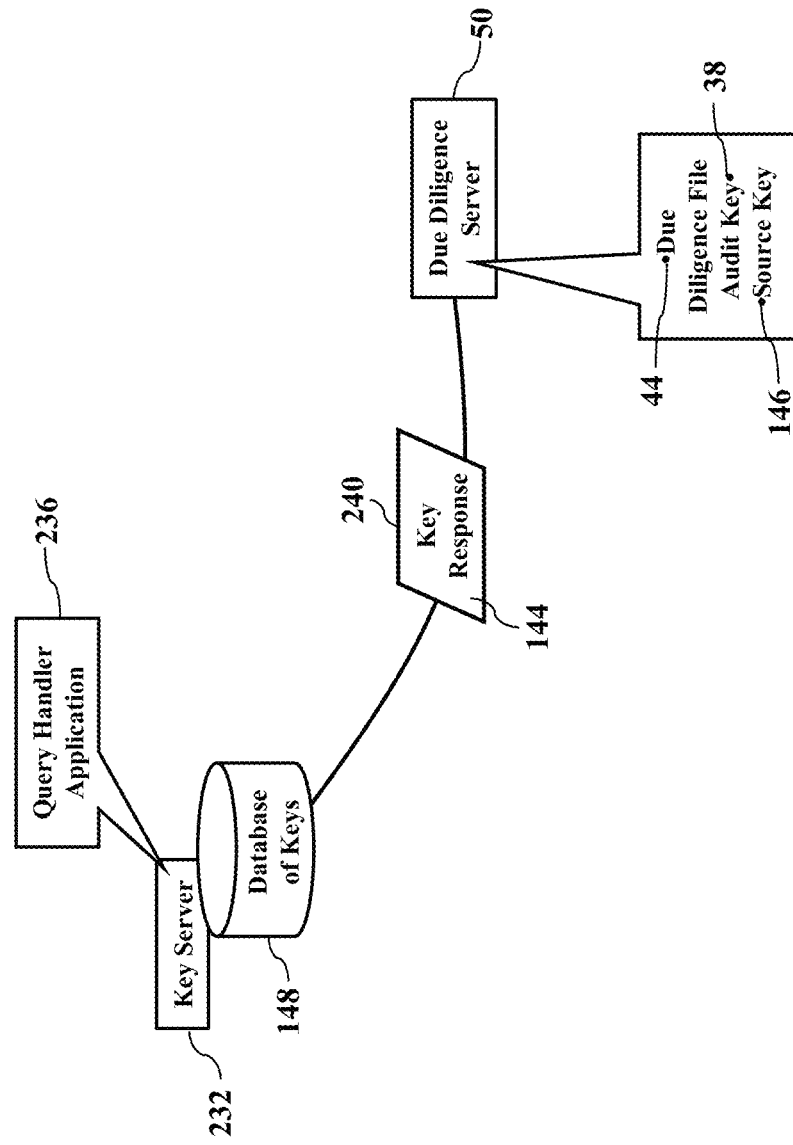

FIGS. 18-20 illustrate sourcing, according to exemplary embodiments. Here the sourcing data 144 may be used to retrieve the original version 32 and/or the current version 52 of the electronic mortgage document 26. When the due diligence server 50 receives the due diligence file 44, the due diligence file 44 may include or specify the cryptographic source key 146 (as this disclosure above explains). The source key 146 may thus represent a unique digital signature generated from hashing the metadata 140 describing the sourcing data 144 representing a storage or network location. Exemplary embodiments may thus generate the one or more source keys 146 as the hash value(s) generated from hashing the sourcing data 144. Once the due diligence server 50 receives the due diligence file 44, the due diligence server 50 may thus read and/or retrieve the source key(s) 146 to easily and quickly discover the storage location of the corresponding original version 32 and/or the current version 52 of the electronic mortgage document 26. That is, the source key 146 may be used to reverse lookup the sourcing data 144. The due diligence server 50 generates and sends a key query 230 to the network address associated with the electronic database 148 of keys. FIG. 18 illustrates a key server 232 storing or maintaining the electronic database 148 of keys. The electronic database 148 of keys, however, may be stored at maintained at any network device or location. The electronic database 148 of keys stores entries that electronically associate different source keys 146 to their corresponding sourcing data 144. The due diligence server 50 queries the key server 232 (via the communications network 46 illustrated in FIGS. 1 and 5) for the source key 146 received via the due diligence file 44. The key server 232 retrieves the corresponding sourcing data 144 and sends a key response 234 to the due diligence server 50. The key response 234 includes information describing the sourcing data 144 retrieved from the electronic database 148 of keys. Exemplary embodiments thus allow the due diligence server 50 to translate or convert the source key 146 into its corresponding sourcing data 144.

FIG. 19 further illustrates the electronic database 148 of keys. The key server 232 functions to answer queries submitted by authorized clients. That is, the key server 232 executes a query handler application 236 that accepts the source key 146 as a query term. The query handler application 236 may then search the electronic database 148 of keys for a matching entry. While the electronic database 148 of keys may have any structure, FIG. 19 illustrates the electronic database 148 of keys as a table 238 that electronically maps, relates, or associates different source keys 146 to their corresponding sourcing data 144. The electronic database 148 of keys may thus be loaded or configured with data or information for determining the retrieval locations of mortgage documents. If a match is determined, the corresponding sourcing data 144 is identified. FIG. 19 illustrates the electronic database 148 of keys as being locally stored in the key server 232, but some of the database entries may be dispersed to multiple other devices or locations in the communications network (illustrated as reference numeral 46 in illustrated in FIGS. 1 and 5). While FIG. 19 only illustrates a few entries, in practice the electronic database 148 of keys may contain hundreds, thousands, or even millions of entries detailing many mortgage documents.

FIG. 20 illustrates database replies. The due diligence server 50 queries the electronic database 148 of keys for the source key 146 received via the due diligence file 44. The key server 232 retrieves and packages the corresponding sourcing data 144 as a key response 240. The key server 232 sends the key response 240 to the network address (e.g., IP address) associated with the due diligence server 50.

Figure 21:
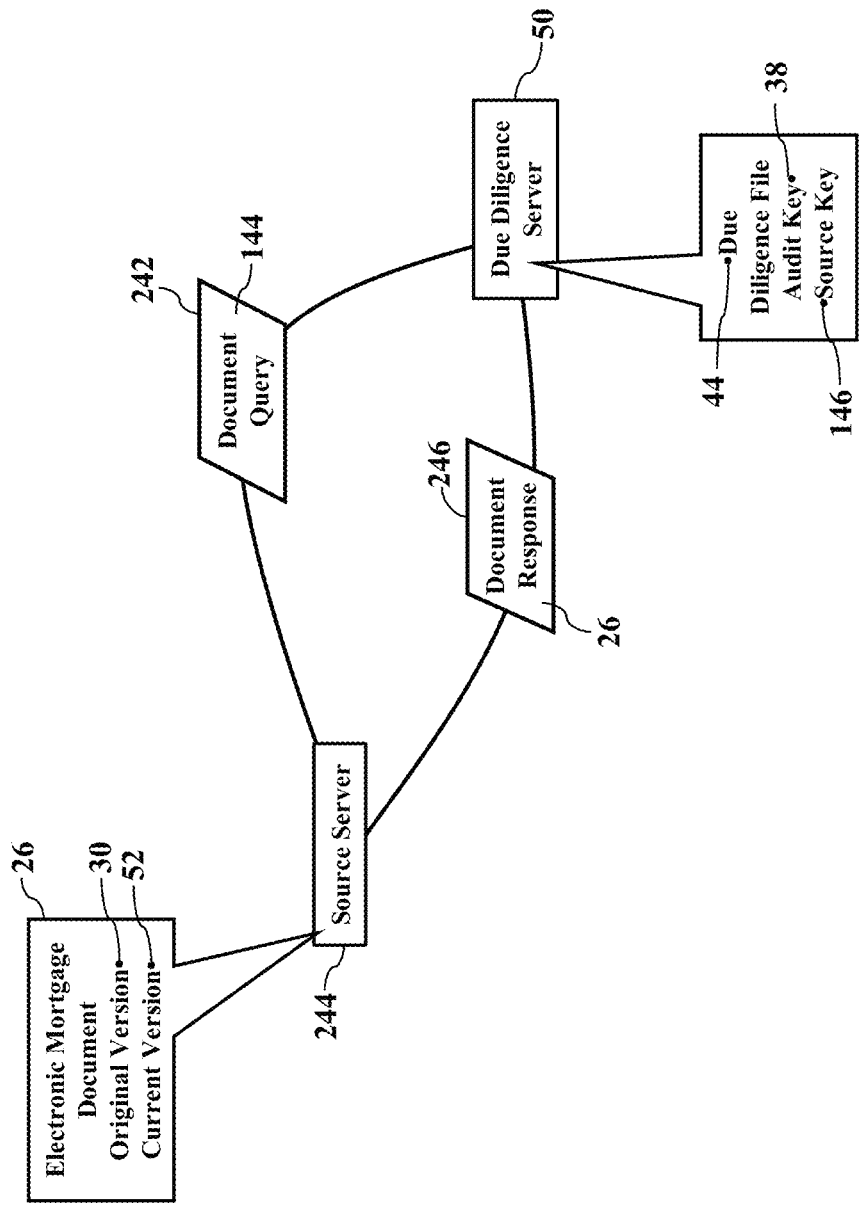
FIG. 21 illustrates document retrieval, according to exemplary embodiments.

FIG. 21 illustrates document retrieval, according to exemplary embodiments. Now that the due diligence server 50 has determined the sourcing data 144 associated with the source key 146, the due diligence server 50 may retrieve the corresponding electronic mortgage document 26. The due diligence server 50 sends a document query 242 specifying the sourcing data 144 to a source server 244. When the source server 244 receives the document query 242, the source server 244 retrieves and sends the corresponding electronic mortgage document 26 as a document response 246. The due diligence server 50 has thus obtained the electronic mortgage document 26 referenced or associated with the due diligence file 44.

Exemplary embodiments may thus be used to retrieve different versions of the electronic mortgage document 26. If the due diligence file 44 references the source key 146 representing the original version 32 of the electronic mortgage document 26, then the due diligence server 50 need only query the key server 232 to determine the corresponding sourcing data 144 describing the network location associated with the original version 32. Similarly, if the due diligence file 44 references the source key 146 representing the current version 52 of the electronic mortgage document 26, then the due diligence server 50 need only query the key server 232 to determine the corresponding sourcing data 144 describing the network location associated with the current version 52. Exemplary embodiments may thus hash any of the metadata 140 and include the resulting hash values in the due diligence file 44.

Figure 22:
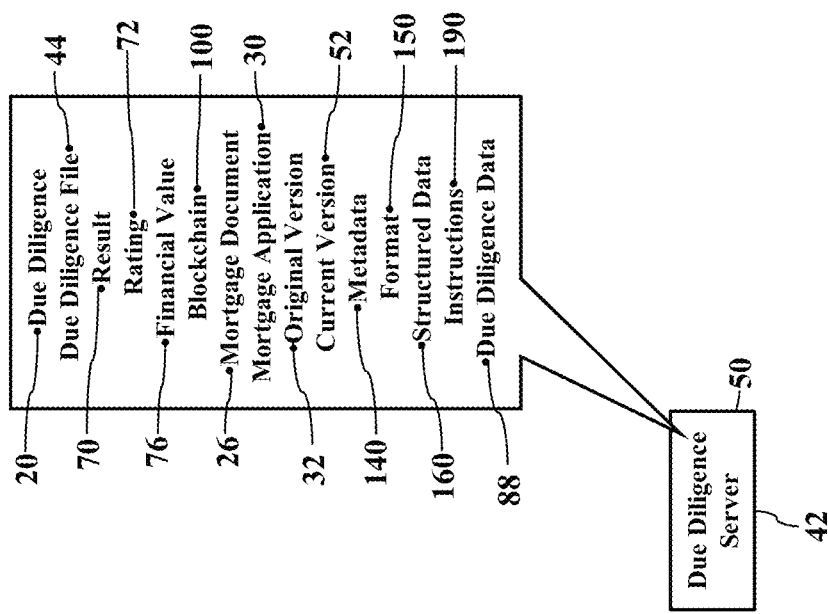
FIG. 22 further illustrates the due diligence, according to exemplary embodiments.

FIG. 22 further illustrates the due diligence 20, according to exemplary embodiments. The due diligence server 50 inspects the due diligence file 44 to conduct the due diligence 20 and to generate the result 70 (such as the rating 72 and/or the financial value 76). The due diligence server 50 may then incorporate the due diligence file 44 and/or the result 70 into the one or more blockchains 100 for historical reference. The blockchain(s) 100 may further include the digital signatures generated from hashing any of the mortgage documents 26, the mortgage applications 30, different data versions (such as the original version 32 and/or the current version 52), the metadata 140, the format 150, the structured data 160, and/or the instructions 190. Exemplary embodiments may thus document the due diligence 20 in the blockchain(s) 100 for future reference. The blockchain(s) 100 may also include the ancillary due diligence data 90 generated from performing the due diligence 20, perhaps also the corresponding hash values from hashing the due diligence data 90. All this data may be stored and tracked on the blockchain 100, both for validation/verification, as well as for future access by others (e.g., if the MBS's are processed again, re-ratings, ex post facto audits, etc.).

Figure 23:
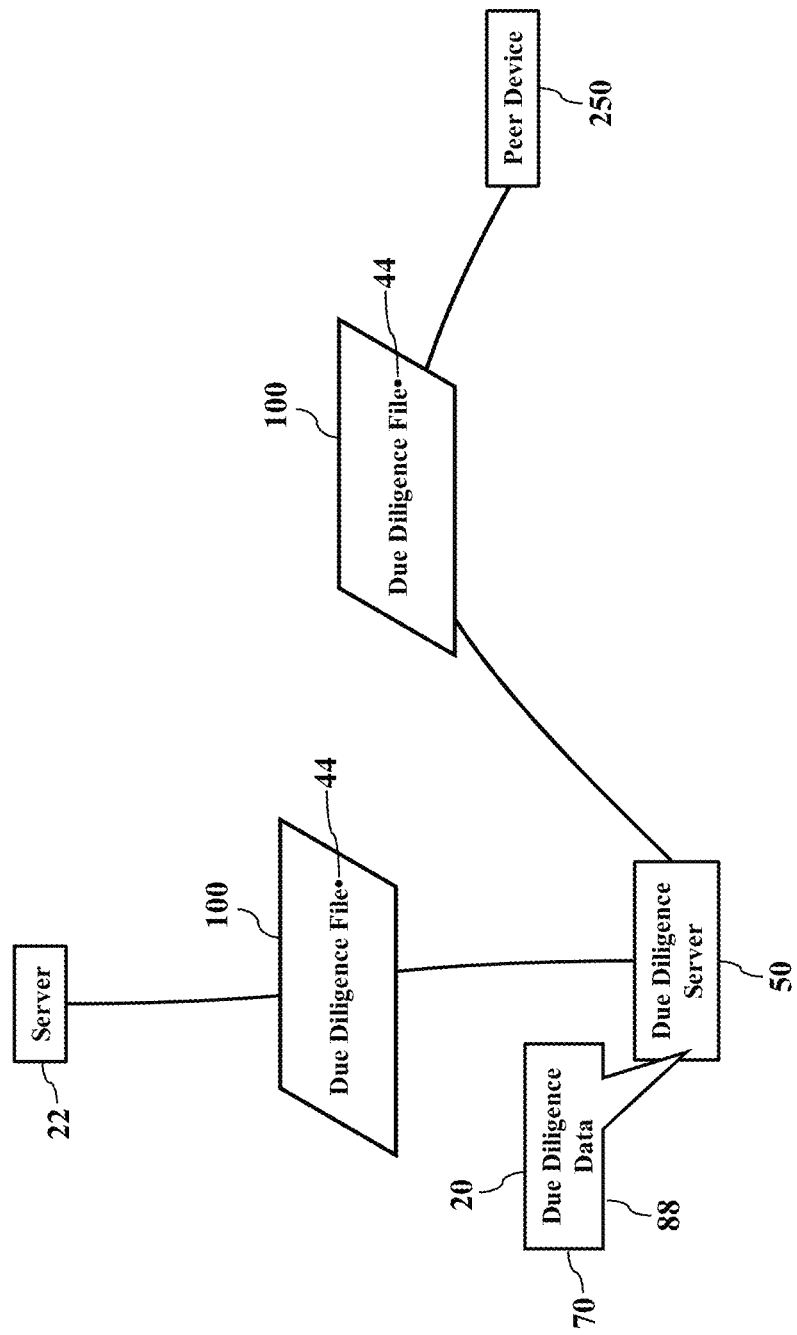
FIG. 23 illustrates publication of a due diligence file, according to exemplary embodiments.

FIG. 23 illustrates publication of the due diligence file 44, according to exemplary embodiments. Here exemplary embodiments may distribute the due diligence file 44 as a record in the blockchain 100. Exemplary embodiments, in other words, may integrate the due diligence file 44 as a transaction or block of data in the blockchain 100. FIG. 23 illustrates the blockchain 100 being distributed from the server 22 to the due diligence server 50 for the due diligence 20. As the due diligence server 50 performs or completes the due diligence 20, the due diligence server 50 may augment the blockchain 100 with the result 70 and the due diligence data 88 (as explained with reference to FIG. 22). The due diligence server 50 may then further publish the blockchain 100 to any recipient (such as a peer device 250). Exemplary embodiments may thus add cryptographic digital signatures that cryptically describe the due diligence 20. Exemplary embodiments may thus integrate the due diligence 20 as a historical ledger transaction or block in the blockchain 100.

Figure 24:
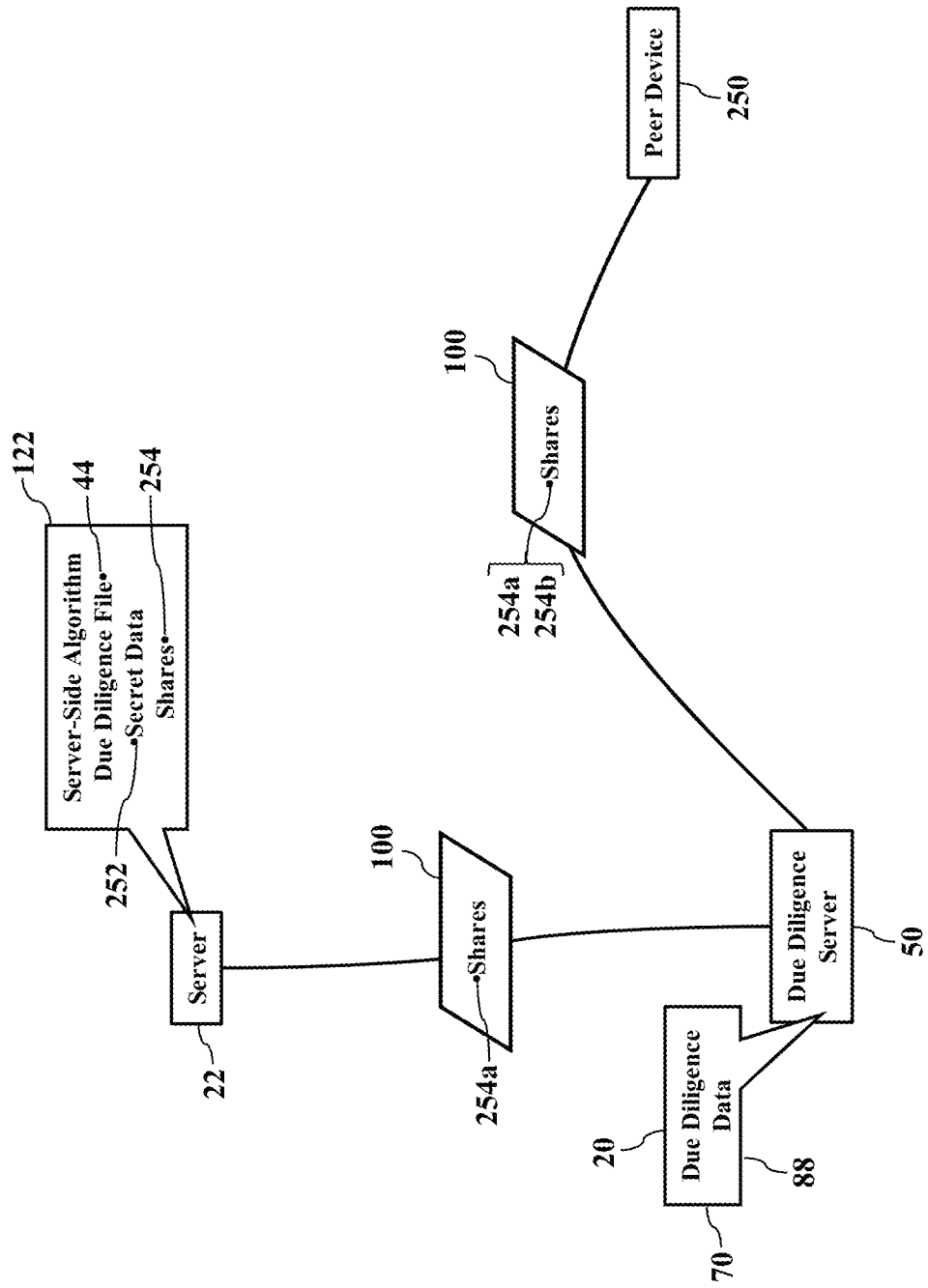
FIGS. 24-25 illustrate secret sharing of the due diligence file, according to exemplary embodiments.
Figure 25:
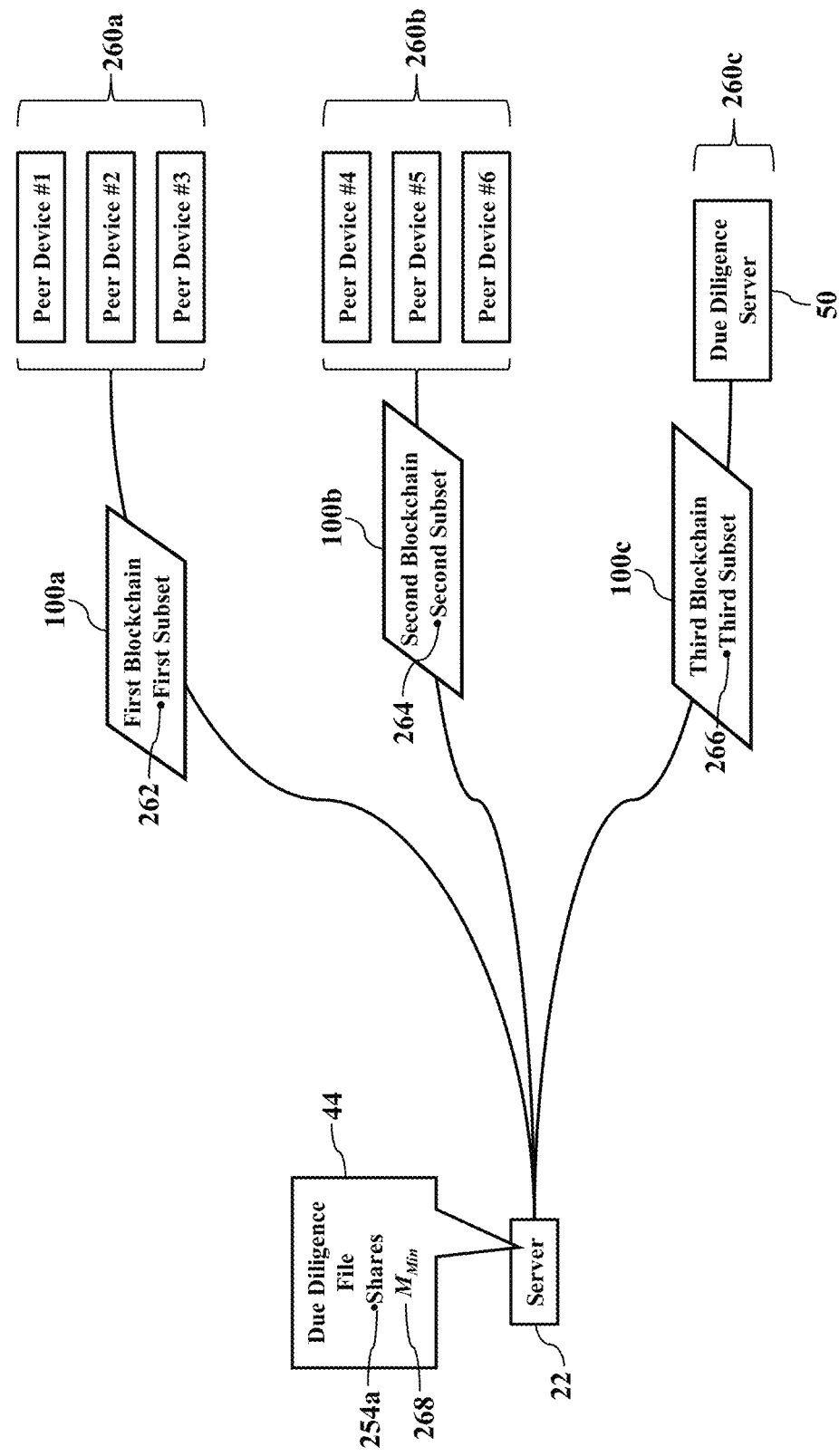

FIGS. 24-25 illustrate secret sharing of the due diligence file 44, according to exemplary embodiments. By now the reader understands that the due diligence file 44 may contain sensitive information (such as an applicant's social security number, income, banking, and other personal information). The due diligence file 44, in plain words, may contain secret data 252. If the due diligence file 44 was to fall into the wrong hands, the secret data 252 may be nefariously used by a rogue entity.

Exemplary embodiments may thus protect the due diligence file 44. When the server 22 generates the due diligence file 44, the server 22 may split the due diligence file 44 into multiple pieces termed shares 254a. The server 22 may then distribute one or more of the shares 254a via the blockchain 100 to the Internet Protocol address associated with the due diligence server 50. Likewise, when the due diligence server 50 performs or completes the due diligence 20, the due diligence server 50 may split the result 70 and the due diligence data 88 (as explained with reference to FIG. 22) into shares 254b. The due diligence server 50 may then augment the blockchain 100 with the shares 254a and/or 254b representing the result 70 and the due diligence data 88. The due diligence server 50 may then further publish the blockchain 100 to any recipient (such as the peer device 250).

FIG. 25 further illustrates secret sharing. Here, though, the server 22 may integrate any one or more of the shares 254a into multiple blockchains 100. While exemplary embodiments may utilize any number of different blockchains 100, FIG. 25 illustrates a simple example of three (3) blockchains 100a-c. The blockchains 100a-c may then be distributed to the same destination or to different destinations. FIG. 25, for example, illustrates three (3) different groups 260a-c of destinations, with the due diligence server 50 being one of the recipients. That is, some of the shares 254a (such as a first subset 262) are integrated into a first blockchain 100a and distributed (via the communications network 46 illustrated in FIGS. 1 and 5) to a first group 260a of peer devices. A second subset 264 of the shares 254a are integrated into a second blockchain 100b and distributed to a second group 260b of peer devices. Still more shares 254a (such as the remaining portion or pieces in a third subset 266) are integrated into a third blockchain 100c and distributed to a third group 260c of peer devices (illustrated as the due diligence server 50). Different collections of the shares 254a, in other words, may be distributed via different blockchains 100a-c to different destinations/devices.

Exemplary embodiments may thus stash the shares 254a in the multiple blockchains 100a-c. Because the due diligence file 44 may be split into the multiple shares 254a, any one or more recipient devices must possess a sufficient minimum number $M_{Min}$ (illustrated as reference numeral 268) of the shares 254a before the due diligence file 44 may be recovered. That is, possession of an insufficient number of the shares 254a guarantees that the due diligence file 44 remains unknown and confidential. So, if the first blockchain 100a contains less than the $M_{Min}$ 268 of the total shares 254a, then the first group 260a of peer devices cannot reconstruct the due diligence file 44. Likewise, if the second blockchain 100b and/or the third blockchain 100c also contains less than the $M_{Min}$ 268, the second group 260b of peer devices and the third group 260c of peer devices are also unable to reveal or decipher the due diligence file 44. In other words, no single one of the multiple blockchains 100a-c stores the requisite minimum number $M_{Min}$ 268 of the shares 254a to launch a brute-force attack on the due diligence file 44. Even multiple ones of the blockchains 100a-c may be purposefully designed to never exceed the requisite minimum number $M_{Min}$ 268 of the shares 254a, perhaps thus forcing a hacker to compromise several or all of the blockchains 100a-c. A rogue attack, in simple words, would have to access and compromise multiple blockchains 100 before jeopardizing the due diligence file 44.

Exemplary embodiments thus present another elegant solution. The sensitive, secret due diligence file 44 may be secretly shared via the one or more blockchains 100a-c. Even if the blockchains 100a-c are dispersed to trusted peer devices, the peer devices still cannot discern the due diligence file 44 until the threshold minimum number $M_{Min}$ 268 of the shares 254a is obtained. Exemplary embodiments thus purposefully add a second-layer of protection, beyond merely trusted receipt of the blockchain 100. The trusted peers simply do not have access to the due diligence file 44 until the minimum number $M_{Min}$ 268 of the shares 254a is obtained.

Any secret sharing scheme may be utilized. The reader is perhaps familiar with Shamir's Secret Sharing Algorithm, which is a well-known cryptographic algorithm. Exemplary embodiments may thus divide the due diligence file 44 into unique parts (e.g., the shares 254a), with each individual share 242a being different from other shares 254a. However, there are many secret sharing or splitting schemes and algorithms for distributing a secret, and exemplary embodiments may be applied regardless of any particular scheme or algorithm.

Figure 26:
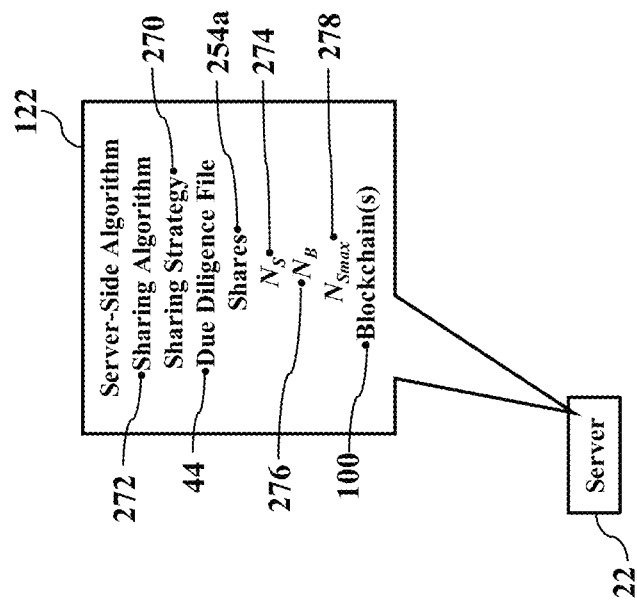
FIGS. 26-27 illustrate a sharing strategy, according to exemplary embodiments.
Figure 27:
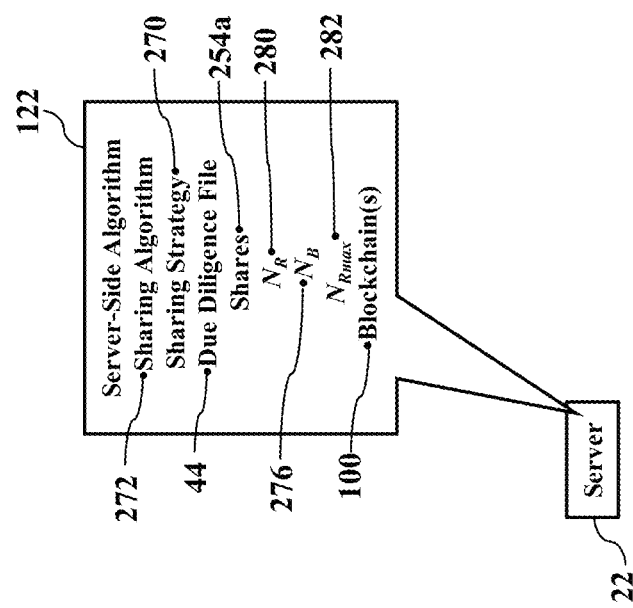

FIGS. 26-27 illustrate a sharing strategy 270, according to exemplary embodiments. Here the server-side algorithm 122 may call a sharing algorithm 272 to retrieve and/or to implement the sharing strategy 270 that defines distribution via the multiple blockchains 100 to protect the due diligence file 44. Suppose, for example, that the total number $N_S$ (illustrated as reference numeral 274) of the shares 254 defines a number $N_B$ (illustrated as reference numeral 276) of the different blockchains 100. The total number $N_S$ 274 of the shares 254a, in other words, may relate by a ratio to the number $N_B$ 276 of blockchains 100 that must be used. As a simple example, the ratio may be $$\frac{N_S}{N_B} = 10{,}000,$$

where the total number $N_S$ 274 of the shares 254a is ten thousand (10,000) times the number $N_B$ 266 of blockchains 100 that must be used. Again, as a simple example, if the due diligence file 44 is associated with one million (1,000,000) shares 254a, then one hundred (100) different blockchains 100 must be generated and distributed. The sharing strategy 270, in other words, may set a maximum number $N_{Smax}$ (illustrated as reference numeral 278) of shares 254a integrated into any single blockchain 100. The sharing strategy 270, in other words, may thus limit the number of the shares 254a exposed by any individual blockchain 100.

FIG. 27 further illustrates the sharing strategy 270. Here, though, the number $N_B$ 276 of blockchains may be based on the number of recipients. That is, the total number $N_R$ (illustrated as reference numeral 280) of the recipients may define the number $N_B$ 276 of the different blockchains 100. The greater the recipients, in other words, then the greater the $N_B$ 276 of blockchains 100 that must be used. Again, suppose that the sharing strategy 270 may again be defined as the ratio $$\frac{N_R}{N_B} = 100,$$

where the total number $N_R$ 280 of the recipients is one hundred (100) times the number $N_B$ 276 of blockchains 100 that must be used. Again, as a simple example, if there are ten thousand recipients, then one hundred (100) different blockchains 100 must be generated and distributed. The sharing strategy 270, in other words, may set a maximum number $N_{Rmax}$ (illustrated as reference numeral 282) of recipients per blockchain 100. The sharing strategy 270, in other words, may thus limit the number of the shares 254a exposed by any individual blockchain 100.

Figure 28:
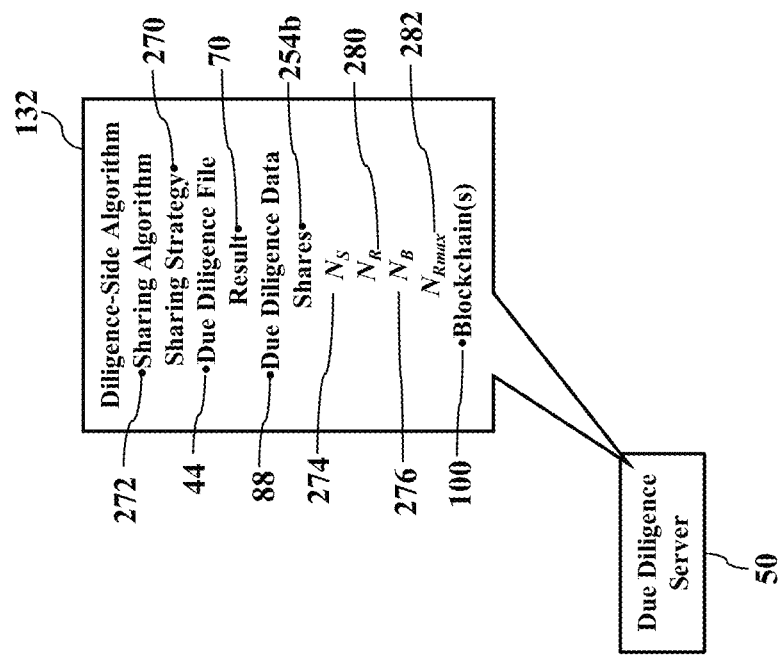
FIG. 28 further illustrates the sharing strategy, according to exemplary embodiments.

FIG. 28 further illustrates the sharing strategy 270, according to exemplary embodiments. Here the sharing strategy 270 may be implemented by the due diligence server 50. As the due diligence server 50 performs the due diligence 20, the diligence-side algorithm 132 may call the sharing algorithm 272 and split the due diligence file 44, the result 70, and/or the due diligence data 88 (as explained with reference to FIG. 22) into the shares 254b according to the sharing strategy 270. That is, exemplary embodiments may define, determine, or calculate the total number $N_S$ 274 of the shares 254b, the number $N_B$ 276 of the different blockchains 100, the maximum number $N_{Smax}$ 278 of the shares 254b integrated into any single blockchain 100, the total number $N_R$ 280, and/or the maximum number $N_{Rmax}$ 282 of recipients per blockchain 100. The sharing strategy 270, in other words, may thus limit the number of the shares 254b exposed by any individual blockchain 100.

The sharing strategy 270 may be implemented as logical rules. If the sharing strategy 270 is mathematically defined (such as the ratio above discussed), the sharing strategy 270 may be expressed as logical statements involving mathematical expressions. Exemplary embodiments may code or program the sharing strategy 270 to achieve policy goals and/or security objectives.

Figure 29:
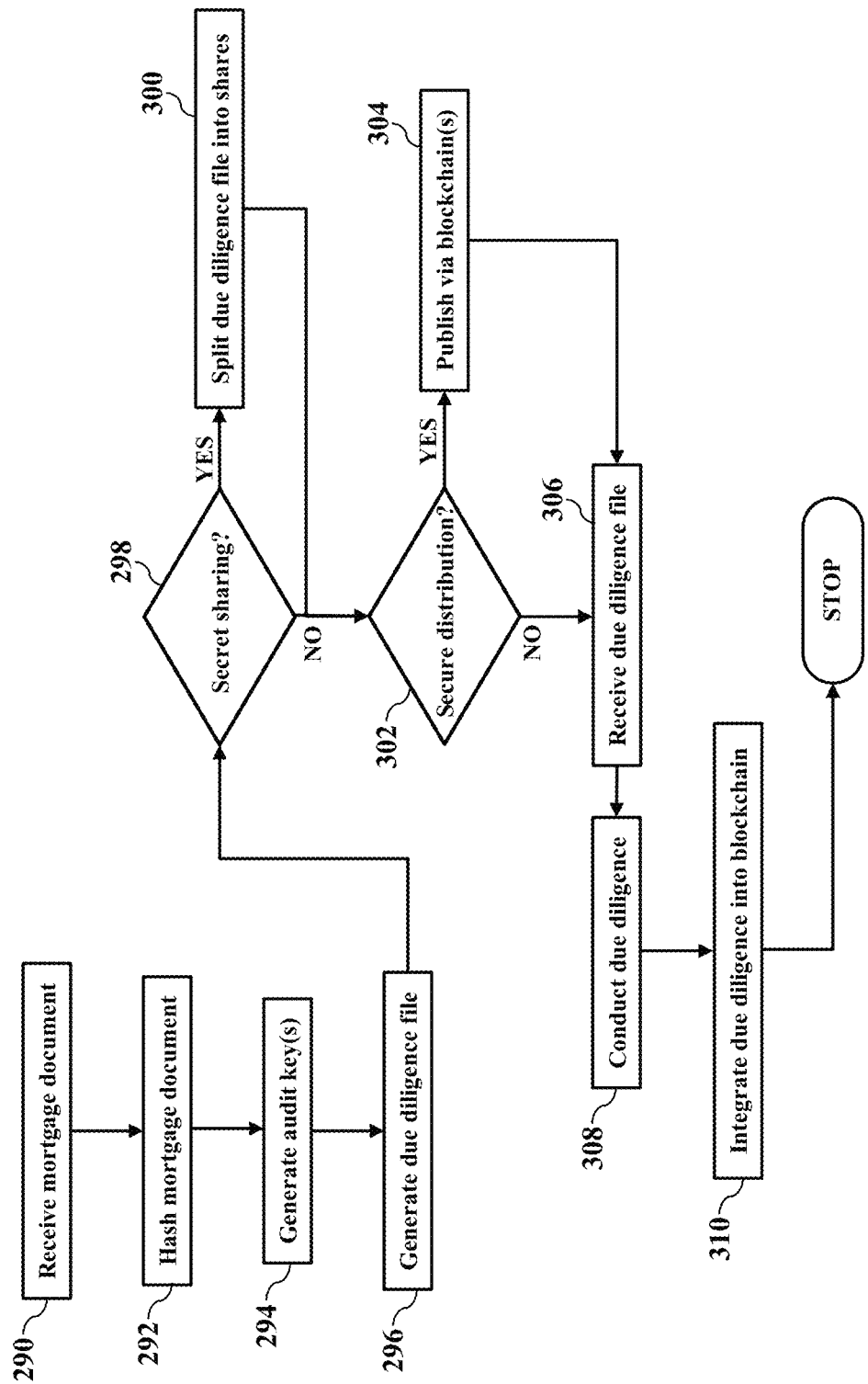
FIG. 29 is a flowchart illustrating a method or algorithm for conducting the due diligence, according to exemplary embodiments.

FIG. 29 is a flowchart illustrating a method or algorithm for conducting the due diligence 20 of the electronic mortgage documents 26, according to exemplary embodiments. The electronic data 24 representing the mortgage document 26 is received (Block 290). The electronic data 24 is hashed using the cryptographic hashing algorithm 36 (Block 292) to generate the audit key(s) 38 (Block 294). The due diligence file 44 is generated (Block 296). If secret sharing is desired (Block 298), then the due diligence file 44 is split into the shares 254a (Block 300). If secure distribution is desired (Block 302), then the due diligence file 44 and/or the shares 254a are published via the blockchain(s) 100 (Block 304). The auditor 42 receives the due diligence file 44 (Block 306) and conducts the due diligence 20 (as this disclosure explains) (Block 308). The due diligence 20 is then integrated into the blockchain(s) 100 (Block 310).

Figure 30:
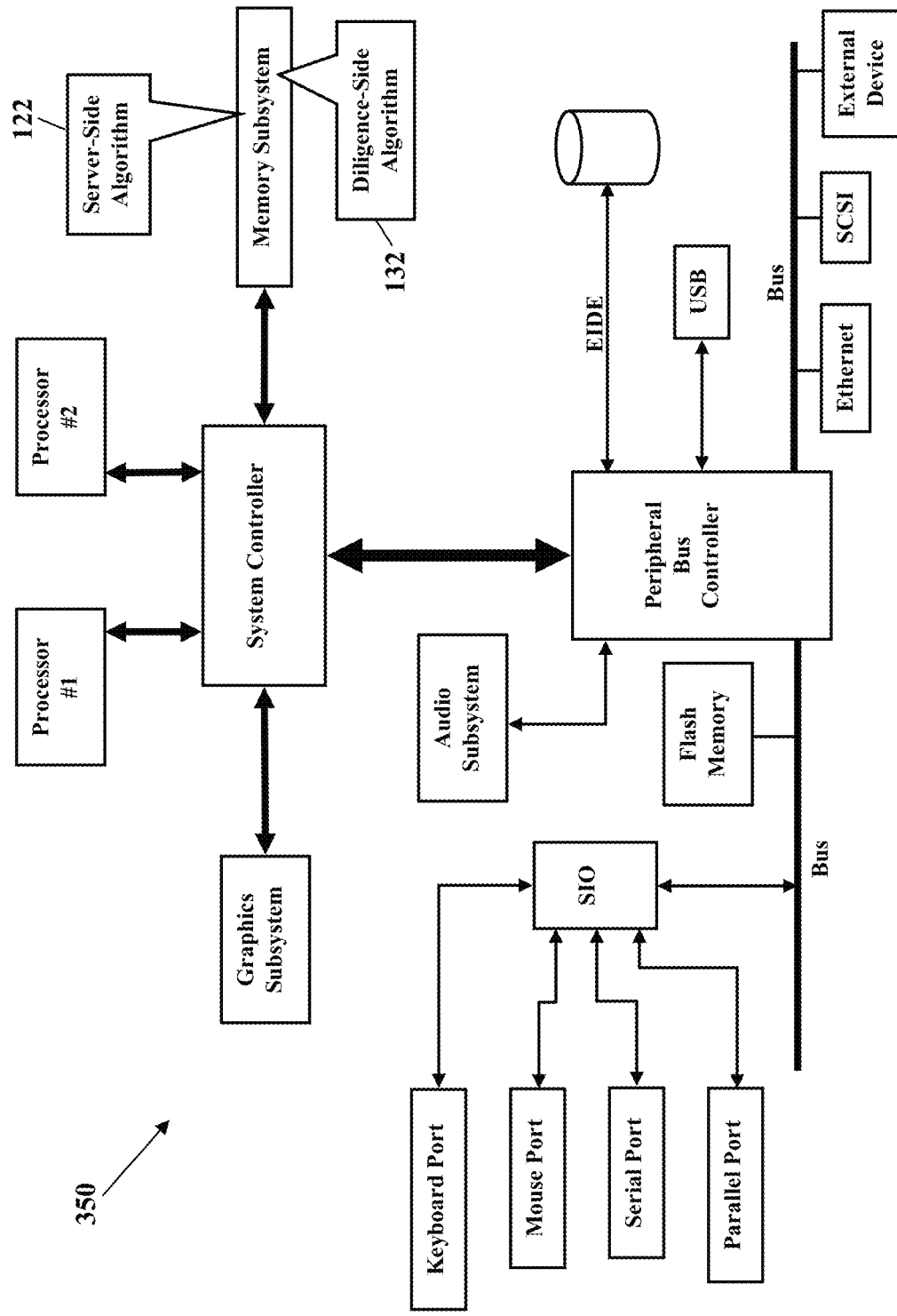
FIGS. 30-31 depict still more operating environments for additional aspects of the exemplary embodiments.

FIG. 30 is a schematic illustrating still more exemplary embodiments. FIG. 30 is a more detailed diagram illustrating a processor-controlled device 350. As earlier paragraphs explained, the server-side algorithm 122 and the diligence-side algorithm 132 may partially or entirely operate in any mobile or stationary processor-controlled device. FIG. 30, then, illustrates the server-side algorithm 122 and the diligence-side algorithm 132 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 31:
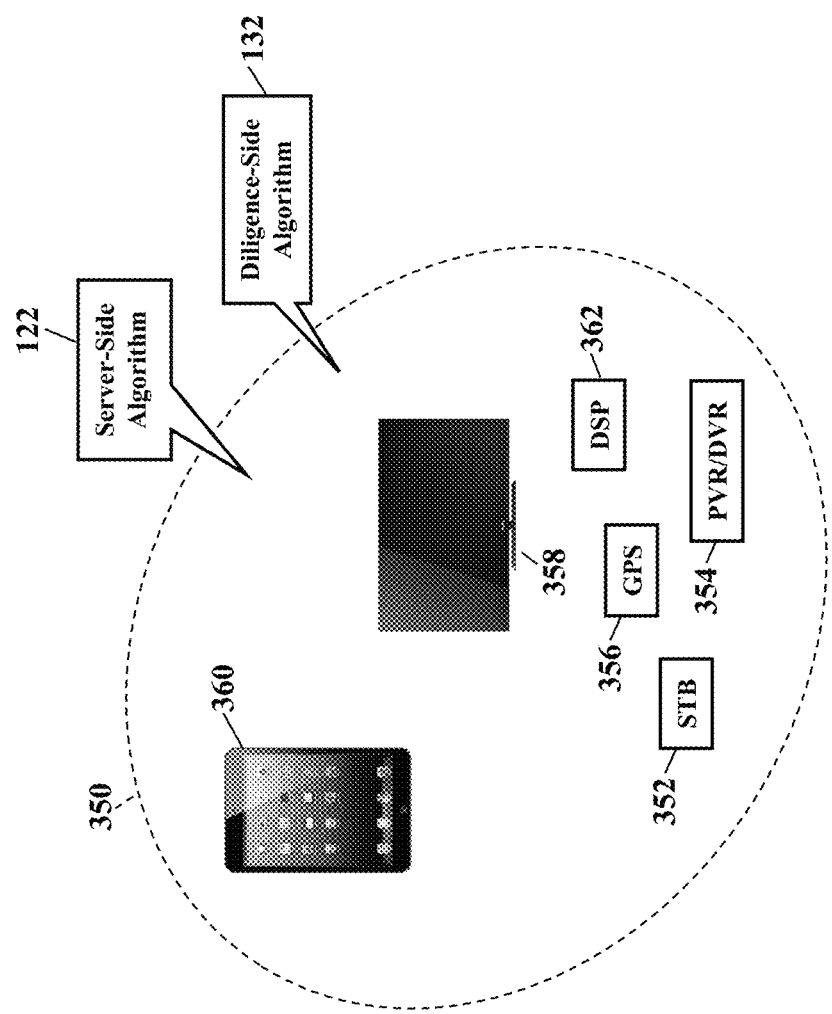

FIG. 31 depicts other possible operating environments for additional aspects of the exemplary embodiments. FIG. 31 illustrates the server-side algorithm 122 and the diligence-side algorithm 132 operating within various other processor-controlled devices 350. FIG. 31, for example, illustrates that the server-side algorithm 122 and the diligence-side algorithm 132 may entirely or partially operate within a set-top box ("STB") (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for conducting the due diligence 20 of mortgage documents, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
generating, by a first server, a cryptographic audit key by hashing a metadata associated with a first version of an electronic document using a cryptographic hashing algorithm;
retrieving, by the first server, a sourcing data associated with a second version of the electronic document;
generating, by the first server, a cryptographic source key by hashing the sourcing data using the cryptographic hashing algorithm;
generating, by the first server, a due diligence file for a due diligence associated with the electronic document, the due diligence file comprising the cryptographic audit key, the cryptographic source key, and an interval of time;
splitting, by the first server, the due diligence file for the due diligence associated with the electronic document into multiple shares via a secret sharing algorithm;
integrating, by the first server, the multiple shares split via the secret sharing algorithm into different blockchains;
transmitting, by the first server, the different blockchains via the Internet to a second server;
storing, by the second server, the different blockchains;
enabling, by the second server, an access to the multiple shares of the due diligence file;
recovering, by the second server, the diligence file from the multiple shares;
invoking, by the second server, a timer associated with the due diligence that increments from an initial value;
determining, by the second server invoking the timer, an expiration of the interval of time specified by the due diligence file; and
disabling, by the second server, the access to the multiple shares based upon the expiration of the interval of time.

2. The method of claim 1, further comprising determining, by the first server, a minimum number of the multiple shares to be integrated into each one of the different blockchains.

3. The method of claim 1, further comprising determining, by the first server, a number of the different blockchains based on a total number of the multiple shares split via the secret sharing algorithm.

4. The method of claim 1, further comprising querying, by the first server, an electronic database to identify the sourcing data.

5. The method of claim 1, further comprising identifying, by the first server, an Internet protocol address as the sourcing data.

6. The method of claim 1, further comprising incrementing, by the second server, the timer from the initial value that corresponds to a receipt of the different blockchains.

7. The method of claim 1, further comprising incrementing, by the second server, the timer from the initial value that corresponds to a read access.

* * * * *